United States Patent
Parayil Venugopalan et al.

(10) Patent No.: US 12,547,815 B2
(45) Date of Patent: Feb. 10, 2026

(54) MULTISCALE PHYSICAL ETCH MODELING AND METHODS THEREOF

(71) Applicant: ASML NETHERLANDS B.V., Veldhoven (NL)

(72) Inventors: Syam Parayil Venugopalan, Eindhoven (NL); Mohammad Reza Kamali, Eindhoven (NL); Michael Kubis, Meerbusch (DE)

(73) Assignee: ASML NETHERLANDS B.V., Veldhoven (NL)

( * ) Notice: Subject to any disclaimer, the term of this patent is extended or adjusted under 35 U.S.C. 154(b) by 583 days.

(21) Appl. No.: 18/018,261

(22) PCT Filed: Aug. 26, 2021

(86) PCT No.: PCT/EP2021/073552
§ 371 (c)(1),
(2) Date: Jan. 26, 2023

(87) PCT Pub. No.: WO2022/043408
PCT Pub. Date: Mar. 3, 2022

(65) Prior Publication Data
US 2023/0297757 A1  Sep. 21, 2023

(30) Foreign Application Priority Data
Aug. 29, 2020 (EP) .................................. 20193506

(51) Int. Cl.
*G06F 30/398* (2020.01)
*H01J 37/32* (2006.01)

(52) U.S. Cl.
CPC ...... *G06F 30/398* (2020.01); *H01J 37/32926* (2013.01); *H01J 2237/334* (2013.01)

(58) Field of Classification Search
CPC .............. G06F 30/398; H01J 37/32926; H01J 2237/334; H01J 37/3299;
(Continued)

(56) References Cited

U.S. PATENT DOCUMENTS

| 9,390,206 B2 | 7/2016 | Ye et al. |
| 10,510,516 B2 | 12/2019 | Lin et al. |

(Continued)

FOREIGN PATENT DOCUMENTS

| TW | 201913842 | 4/2019 |
| TW | 202006817 | 2/2020 |

(Continued)

OTHER PUBLICATIONS

International Search Report and Written Opinion issued in International Application No. PCT/EP2021/073552, dated Oct. 15, 2021.
(Continued)

*Primary Examiner* — Paul Dinh
(74) *Attorney, Agent, or Firm* — Pillsbury Winthrop Shaw Pittman LLP

(57) ABSTRACT

Systems and methods for simulating a plasma etch process are disclosed. According to certain embodiments, a method for simulating a plasma etch process may include predicting a first characteristic of a particle of a plasma in a first scale based on a first plurality of parameters; predicting a second characteristic of the particle in a second scale based on a modification of the first characteristic caused by a second plurality of parameters; and simulating an etch characteristic of a feature based on the first and the second characteristics of the particle. A multi-scale physical etch model or a multi-scale data driven model may be used to simulate the plasma etch process.

20 Claims, 13 Drawing Sheets

(58) Field of Classification Search
CPC ....... H01J 2237/3341; H01J 2237/3343; H01J 2239/041; H01J 2239/0434
USPC .......................................................... 716/111
See application file for complete search history.

(56) References Cited

U.S. PATENT DOCUMENTS

2019/0049937 A1* 2/2019 Tetiker .............. H01J 37/32174
2022/0406580 A1* 12/2022 Shinagawa ........... G06F 30/398

FOREIGN PATENT DOCUMENTS

TW         202018553      5/2020
WO     2020/020759      1/2020

OTHER PUBLICATIONS

Office Action issued in Taiwanese Patent Application No. 110131017, dated Jun. 21, 2022.
J.O. Díaz, "A feature-to-wafer-scale model of etch-rate non-uniformity in deep reactive ion etching", Thesis, Massachusetts Institute of Technology, dspace.mit.edu/handle/1721.1/61572 (accessed Jan. 26, 2023), pp. 1-99, (2010).
M.J. Grapperhaus, "Multi Scale Transport Phenomena in Low-Pressure Plasmas," Thesis, University of Illinois at Urbana-Champaign, hdl.handle.net/2142/85937 (accessed Jan. 26, 2023), pp. 1-120 (1998).
S. Murakawa et al., "Ion trajectory distortion and profile tilt by surface charging in plasma etching," Applied Physics Letters, 64 (12), pp. 1558-1560 (1994).
R. van Haren et al., "Intra-field etch induced overlay penalties", SPIE vol. 11329 (2020).

* cited by examiner

MULTISCALE PHYSICAL ETCH MODELING AND METHODS THEREOF

CROSS-REFERENCE TO RELATED APPLICATIONS

This application is the U.S. national phase entry of PCT application no. PCT/EP2021/073552 which was filed on Aug. 26, 2021, which claims priority of European patent application No. 20193506.1 which was filed on Aug. 29, 2020 and which is incorporated herein in its entirety by reference.

TECHNICAL FIELD

The embodiments provided herein disclose methods of modeling and simulating semiconductor fabrication processes, and more particularly methods for multiscale physical etch modeling and simulation to mitigate process asymmetries in metrology and semiconductor processing techniques.

BACKGROUND

While previous generations of integrated circuits could be fabricated using wet, chemical etching techniques, complex chip designs of today and the future cannot be made without using plasma processes to obtain the necessary pattern transfer fidelity. Plasma equipment and plasma processing play a vital role in fabrication of three-dimensional devices such as 3D-FLASH, or 1-megabit dynamic random access memories (DRAMs). Features such as gate electrodes or interconnection vias have widths that are comparable to the thin film thickness, therefore, to transfer the pattern with high fidelity, etching must be anisotropic, i.e., much faster perpendicular than parallel to the surface.

Although plasma etching is desirable in producing patterns with high aspect ratios, it may cause etch-induced asymmetry of alignment features across multiple layers in a chip, leading to etch overlay and alignment errors. As microelectronic devices continue to shrink and process requirements become more stringent, plasma modeling and simulation becomes increasingly more attractive as a tool for design, control, and optimization of mask designs, die designs, and etch recipes. The existing modeling techniques including physical modeling and data-driven modeling, though better than experimental techniques, are resource-intensive, time consuming, non-scalable, and do not account for crosstalk between multiple length scales. These limitations render the existing modeling techniques inadequate and inefficient.

SUMMARY

One aspect of the present disclosure is directed to a method for simulating a plasma etch process, the method comprising predicting a first characteristic of a particle of a plasma in a first scale based on a first plurality of parameters, predicting a second characteristic of the particle in a second scale based on a modification of the first characteristic caused by a second plurality of parameters, and simulating an etch characteristic of a feature based on the first and the second characteristics of the particle.

The method may further comprise predicting a sheath profile of the plasma in the first scale based on the first plurality of parameters, wherein the first scale comprises a wafer-scale. Predicting the first characteristic comprises determining a gradient of the predicted sheath profile, and wherein the first characteristic comprises an angle of incidence, a trajectory, or an energy of the particle directed towards a wafer. The first plurality of parameters may comprise geometry of a plasma reactor configured to perform the plasma etch process, a process condition for the plasma etch process, or a location on the wafer. Predicting the second characteristic may comprise predicting a modification of the angle of incidence, the trajectory, or the energy of the particle in the second scale, and wherein the second scale comprises a die-scale. Predicting the second characteristic may further comprise accessing a layout of a die, the layout comprising a pattern density map, and predicting the second characteristic of the particle based on the pattern density map, wherein the particle may comprise a charged particle or an uncharged particle. Predicting the second characteristic of the charged particle of the plasma may further comprise identifying, based on the pattern density map, a first region of the die having a first pattern density and a second region of the die having a second pattern density different from the first pattern density; and predicting an electric potential gradient between the identified first and the second regions; and predicting the second characteristic of the charged particle based on the electric potential gradient. In some embodiments, predicting the second characteristic of the uncharged particle of the plasma may comprise predicting a concentration gradient of an etchant between the identified first and the second regions, predicting a diffusion flux of the etchant based on the concentration gradient, and predicting the second characteristic of the uncharged particle based on the diffusion flux. The method may further comprise predicting the modified trajectory of the particle in the second scale based on a pattern density gradient of the die and a Gaussian kernel, wherein the Gaussian kernel is a multi-length scale kernel comprising a length scale ranging from 5 nm to 50 μm. The second plurality of parameters may comprise the layout, the pattern density, or a pattern density variation of the die. Simulating the etch characteristic may comprise simulating an etch rate, an etch profile, or an etch asymmetry of the feature based on the pattern density map of the die. In some embodiments, pattern density is characterized or represented pattern perimeter density.

Another aspect of the present disclosure is directed to a method for generating a simulated image of a feature. The method may comprise acquiring a first image of the feature, identifying the feature based on a pattern or pattern-perimeter information from the image, and predicting an etch profile of the feature to be etched using a plasma etch process. Predicting the etch profile of the feature may comprise predicting a first characteristic of a particle of a plasma in a first scale based on a first plurality of parameters, and predicting a second characteristic of the particle in a second scale based on a modification of the first characteristic caused by a second plurality of parameters. The method may further comprise generating a second image comprising the predicted etch profile of the feature.

Another aspect of the present disclosure is directed to a plasma etch simulation system, comprising a memory storing a set of instructions, and a processor configured to execute the set of instructions to cause the plasma etch simulation system to predict a first characteristic of a particle of a plasma in a first scale based on a first plurality of parameters, predict a second characteristic of the particle in a second scale based on a modification of the first characteristic caused by a second plurality of parameters, and simulate an etch characteristic of a feature based on the first and the second characteristics of the particle.

The processor may be configured to execute the set of instructions to further cause the plasma etch simulation system to predict a sheath profile of the plasma in the first scale based on the first plurality of parameters, determine a gradient of the predicted sheath profile; and determine an angle of incidence, a trajectory, or an energy of the particle directed towards a wafer based on the gradient of the predicted sheath profile. In some embodiments, the processor may be configured to execute the set of instructions to further cause the plasma etch simulation system to access a layout of a die, the layout comprising a pattern density map, e.g., a pattern-perimeter density map, and predict the second characteristic of the particle based on the pattern density map, wherein the particle may comprise a charged particle or an uncharged particle. In some embodiments, the processor may be configured to execute the set of instructions to further cause the plasma etch simulation system to identify, based on the pattern density map, a first region of the die having a first pattern density and a second region of the die having a second pattern density different from the first pattern density, predict an electric potential gradient based on the identified first and the second regions, and predict the second characteristic of the charged particle based on the electric potential gradient. In some embodiments, the processor may be configured to execute the set of instructions to further cause the plasma etch simulation system to predict a concentration gradient of an etchant between the identified first and the second regions, predict a diffusion flux of the etchant based on the concentration gradient, and predict the second characteristic of the uncharged particle based on the diffusion flux.

Another aspect of the present disclosure is directed to a non-transitory computer readable medium storing a set of instructions that is executable by one or more processors of an apparatus to cause the apparatus to perform a method of simulating a plasma etch process. The method may comprise predicting a first characteristic of a particle of a plasma in a first scale based on a first plurality of parameters, predicting a second characteristic of the particle in a second scale based on a modification of the first characteristic caused by a second plurality of parameters, and simulating an etch characteristic of a feature based on the first and the second characteristics of the particle.

Another aspect of the present disclosure is directed to a non-transitory computer readable medium storing a set of instructions that is executable by one or more processors of an apparatus to cause the apparatus to perform a method of simulating a plasma etch process. The method may comprise acquiring a first image of the feature, identifying the feature based on a pattern-perimeter information from the image, and predicting an etch profile of the feature to be etched using a plasma etch process. Predicting the etch profile of the feature may comprise predicting a first characteristic of a particle of a plasma in a first scale based on a first plurality of parameters, and predicting a second characteristic of the particle in a second scale based on a modification of the first characteristic caused by a second plurality of parameters. The method may further comprise generating a second image comprising the predicted etch profile of the feature.

Another aspect of the present disclosure is directed to a method of simulating a plasma etch process. The method may include predicting, in a first scale, a first characteristic of a chamber of a plurality of chambers configured to perform the plasma etch process, predicting, in a second scale, a second characteristic of the chamber of the plurality of chambers, wherein the first scale comprises the second scale, and simulating an etch characteristic of a feature based on the first and the second characteristics of the chamber.

Another aspect of the present disclosure is directed to a plasma etch simulation system. The system may include a memory storing a set of instructions, and a processor configured to execute the set of instructions to cause the plasma etch simulation system to predict, in a first scale, a first characteristic of a chamber of a plurality of chambers configured to perform the plasma etch process, predict, in a second scale, a second characteristic of the chamber of the plurality of chambers, wherein the first scale comprises the second scale, and simulate an etch characteristic of a feature based on the first and the second characteristics of the chamber.

Other advantages of the embodiments of the present disclosure will become apparent from the following description taken in conjunction with the accompanying drawings wherein are set forth, by way of illustration and example, certain embodiments of the present invention.

DETAILED DESCRIPTION

Figure 1:
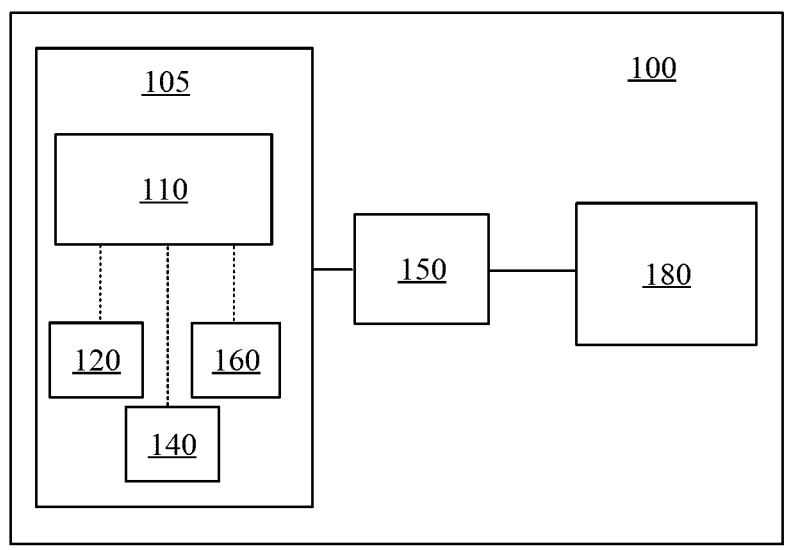
FIG. 1 is a schematic diagram illustrating an exemplary plasma process simulation system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims. For example, although some embodiments are described in the context of utilizing electron beams, the disclosure is not so limited. Other types of charged particle beams may be similarly applied. Furthermore, other imaging systems may be used, such as optical imaging, photo detection, x-ray detection, etc.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than 1/1000th the size of a human hair.

Making these extremely small ICs is a complex, time-consuming, and expensive process, often involving hundreds of individual steps. Errors in even one step have the potential to result in defects in the finished IC, thereby rendering it useless. Thus, one goal of the manufacturing process is to avoid such defects to maximize the number of functional ICs made in the process, that is, to improve the overall yield of the process.

Low pressure, cold, weakly ionized glow discharge plasmas are used extensively in the processing of semiconductor materials. Plasmas may be used for etching and deposition of thin films of semiconductors and dielectric materials. The goals of a plasma etch process are to achieve high etch rate, uniformity, selectivity, anisotropy, and no radiation damage. High etch rate is desirable to increase the process throughput, however, etch rate must be balanced against uniformity, selectivity, and anisotropy. There are a number of externally controlled variables (process inputs) that may influence the plasma characteristics, and in turn the process output. For a given etch chamber configuration, the etch conditions such as plasma power, pressure, frequency, etc. may be adjusted to affect the etch rates, etch uniformity, etch selectivity, or the like. Although plasma process development has been largely based on experimental procedures, as devices continue to become increasingly complex, computer-aided design of plasma processes based on modeling and simulation have become more attractive.

Existing physical etch models may be able to predict plasma characteristics and etch profiles, but are limited to device feature scales and lack scalability. Extrapolating device feature scale simulations to wafer scale simulations may be extremely inefficient and inaccurate due to computational constraints. Existing data-driven models including convolutional encoder-decoder networks, neural networks, deep learning algorithms, etc. may require intensive training for each process, multiple locations on the wafer, and reticle designs. Further, neither the existing physical etch models nor data-driven models account for crosstalk between length scales ranging from feature scale to wafer scale, spanning 6 to 8 orders of magnitude of device dimensions.

Some embodiments of the present disclosure are directed to methods of simulating a plasma etch process using a multi-scale plasma etch model. The method includes predicting, using a wafer-scale model, the characteristics of an etchant ion species in a wafer-scale based on plasma etch chamber geometry or plasma etch process conditions at a location on the wafer. The method may further include predicting, using a die-scale model, the modification of characteristics of the etchant ion species in die-scale based on a multiscale gradient of a Gaussian kernel convolved with pattern density of the die. In some embodiments, patterns density is represented or characterized by pattern-perimeter density of the die. The information obtained from the wafer-scale model and the die-scale model are used as input to a feature scale etch model, either physical or data-driven, to simulate the etch profile of a feature on the die. The method provides a multi-scale physical or a data-driven etch model to simulate etch profiles, useful in mitigating etch-induced asymmetries and etch-induced overlay errors.

Relative dimensions of components in drawings may be exaggerated for clarity. Within the following description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Reference is now made to FIG. 1, which illustrates an exemplary plasma process simulation system 100, consistent with embodiments of the present disclosure. As shown in FIG. 1, plasma process simulation system 100 may comprise a plasma process simulation system including an apparatus 105 in direct or indirect communication with a processor 180, and a controller 150 configured to control apparatus 105. Apparatus 105 may communicate with processor 180 wirelessly, remotely, or through a wired connection, among other communication methods. Apparatus 105 may include a plasma process chamber 110, a gas supply system 120 to supply and regulate gases or a mixture of gases to plasma process chamber 110, a vacuum system 140, and a power supply 160. While the description and drawings are directed to ionized gases, it is appreciated that the embodiments are not used to limit the present disclosure to specific charged particles.

In the field of semiconductor fabrication and processing, plasma-assisted material processes are generally carried out in plasma chambers or plasma reactors, such as plasma process chamber 110. Plasma reactors, based on the method of excitation of plasma and chamber configuration, may be used to perform processes including, but not limited to, etching, deposition, surface treatment, or defect detection in wafers (e.g., semiconductor wafers or wafers made of other material(s)) or samples (wafers and samples are collectively referred to as "wafers" or "wafer" hereafter).

Capacitively Coupled Plasma (CCP) reactors, and high density plasma reactors such as Inductively Coupled plasma (ICP) reactors and Electron Cyclotron Resonant (ECR) plasma reactors, have been widely used in the semiconductor industry for Plasma Enhanced Chemical Vapor Deposition (PECVD) and Reactive Ion Etching (RIE) or plasma-assisted high-aspect ratio etching. A conventional plasma reactor, such as a CCP reactor, typically consists of two parallel plate electrodes in a chamber. The reactive nature of the discharged gas in the chamber is sustained due to the radio frequency (RF) voltage on the two electrodes and the high voltage on the electrodes causes ion bombardment on the surface of a wafer. The typical pressure in the chamber ranges from $10^{-3}$-10 Torr. An ICP reactor typically consists of two sets of RF coils located outside the plasma chamber. RF power is provided to the chamber by an inductive magnetic field. In general, by adjusting RF bias voltage to the wafer, one can independently control the ion bombardment energy.

Gas supply system 120 may be configured to supply and regulate the supply of gases used in the plasma process to plasma process chamber 110. Gas supply system 120 may include gas flow controllers, gas flow monitors, gas mixers, gas manifold, gas lines, among other components to help control the flow rate, concentration, proportion of gases supplied to plasma process chamber 110. Gas supply system 120 and plasma process chamber 110 may be controlled by controller 150, which controls and regulates the introduction of various gases and carrier gas to plasma process chamber 110. A carrier gas may include an inert gas or a mixture of inert gases that may be used to "carry" or deliver desired active gases. The carrier gas may not react with the active gases or with the by-products of the plasma process.

Plasma process chamber 110 may be connected to vacuum system 140, which removes gas molecules in plasma process chamber 110 to reach a first pressure below the atmospheric pressure. Vacuum system 140 may include more than one vacuum pump such as, but not limited to, a mechanical pump, a diffusion pump, a turbomolecular pump, an ion pump, or a combination thereof, to obtain the desired first pressure. After reaching the first pressure, desired gases may be introduced into plasma process chamber 110. The introduction of desired gases may raise the pressure in plasma process chamber 110 to a desired second pressure, typically in the range of 1 mTorr to 10 Torr. After reaching the second pressure, the wafer may be exposed to a plasma generated in plasma process chamber 110 based on the chemistry of gases, flow rate, configuration, power distribution, among other factors. Vacuum system 140 may be controlled by controller 150 to, for example, adjust the chamber pressure by adjusting valve positions, valve timing, among other things.

Plasma process chamber 110 may be connected to power supply 160, which is configured to supply and regulate power to one or more electrodes, coils, or the like. In an example, power supply 160 may be configured to apply RF voltage to an electrode, while maintaining another electrode at a reference voltage, to generate an alternating electric field between two electrodes. The alternating electric field may be utilized to excite the gas molecules, thereby generating a plasma in plasma process chamber 110. It is appreciated that power supply 160 may be used to supply electrical power to one or more components of apparatus 105, as appropriate.

Controller 150 may be electronically connected to apparatus 105 and may be electronically connected to other components including, but not limited to, processor 180, as well. Controller 150 may be a computer configured to execute various controls of apparatus 105 using processing circuitry to execute various signal and data processing functions. While controller 150 is shown in FIG. 1 as being outside of the structure that includes plasma process chamber 110, it is appreciated that controller 150 may be a part of apparatus 105.

Processor 180 may be a computer configured to communicate with controller 150 or apparatus 105. As shown, processor 180 may communicate with apparatus 105 through controller 150. In an example where controller 150 is a part of apparatus 105, processor 180 may directly communicate with apparatus 105. Processor 180 may include a memory to store a set of instructions which, upon execution, may allow plasma process chamber 110 to perform a desired function. In some embodiments, processor 180 may be configured to receive instructions from a user through a user-interface, perform simulation and mathematical modeling of a process based on user input, predict a process outcome, and generate an image depicting the predicted process outcome.

Figure 2:
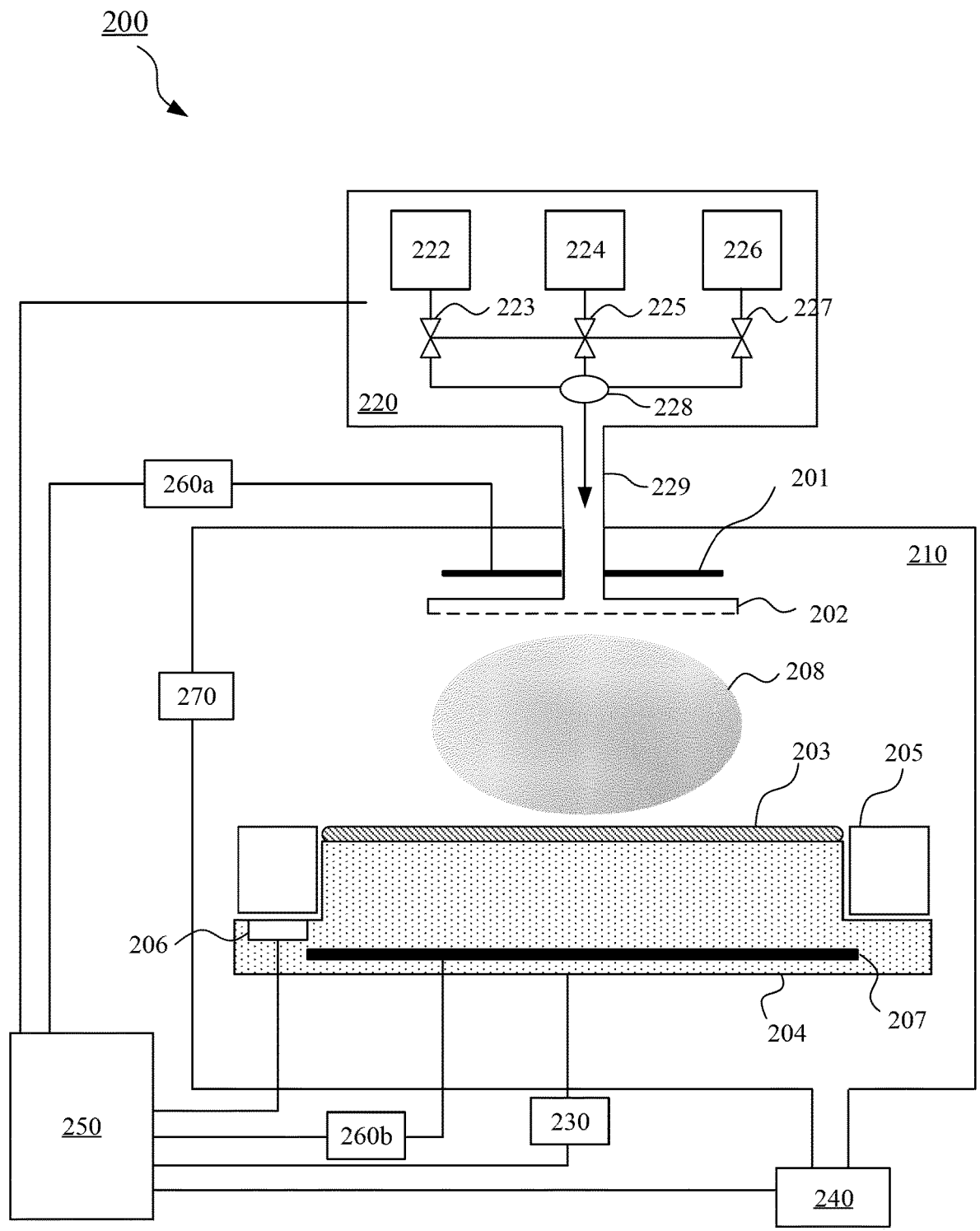
FIG. 2 is a schematic diagram illustrating an exemplary apparatus configured for performing a plasma process, consistent with embodiments of the present disclosure.

Reference is now made to FIG. 2, which illustrates an exemplary apparatus 200 configured for performing a plasma process, consistent with embodiments of the present disclosure. Apparatus 200 may include a plasma process chamber 210, a gas supply system 220, a stage positioning system 230, a vacuum system 240, a controller 250, a power supply system comprising power generators 260a and 260b, and a pressure sensor 270. It is to be appreciated that other relevant components may be added or omitted, as needed.

While the present disclosure provides examples of plasma process chamber 210 configured to be used as a plasma etching system, it should be noted that aspects of the disclosure in their broadest sense, are not limited to a plasma etch chamber or an etching system. Rather, it is appreciated that the foregoing principles may be applied to other chambers as well. For example, plasma process chamber 210 may be configured for use as a deposition chamber to grow thin films of semiconductors or dielectrics, or as a surface treatment chamber to strip residual photoresist.

In some embodiments, plasma process chamber 210 may be configured for use as a plasma etch chamber or a plasma etch reactor, and therefore, may also be referred to hereafter as a plasma etch chamber 210. In an exemplary plasma etch process, a wafer such as wafer 203 may be placed in plasma etch chamber 210 such that wafer 203 may be exposed to a plasma generated by introduction of an etchant gas or an etchant gas mixture. Plasma etch chamber 210 may include a gas supply system 220 that may deliver one or more gaseous etchants to plasma etch chamber 210. The gas supply system 220 may be configured to supply the various desired gaseous etchants to plasma etch chamber 210 through a gas controller 228 and a feedline 229. In some embodiments, a gas supply system 220 may also be configured to control the flow rate of an etchant gas or a mixture of etchant gases into plasma etch chamber 210 by controlling the flow and pressure of a carrier gas through gas supply system 220. In some embodiments, the etching process performed by plasma etch chamber 210 may be a RIE or deep reactive-ion etching (DRIE) process.

In some embodiments, gas supply system 220 may include gas sources 222, 224, and 226. In an exemplary embodiment, gas sources 222 and 224 may comprise etchant gases, and gas source 226 may comprise a carrier gas. Although only three gas sources 222, 224, and 226 are illustrated in FIG. 2, this is done merely for clarity, and it should be appreciated that any suitable number of etchant gas sources may be included. For example, in an embodiment in which five separate etchants may be utilized, there may be five etchant gas sources, or four etchant gas sources and one carrier gas source, or three etchant gas sources and two carrier gas sources, or other configurations may be possible as well, as needed.

Each of the gas sources 222, 224, and 226 may be a vessel, such as a gas storage tank or a gas cylinder, or a gas dewar, placed locally or remotely from plasma etch chamber 210. In some embodiments, gas supply system 220 may be part of a facility that independently prepares and delivers the desired etchants. Any suitable source for the desired etchants may be utilized as a gas source, and all such sources are fully intended to be included within the scope of the embodiments. A carrier gas or a diluent gas may be used to help push or "carry" the various desired etchants to plasma etch chamber 210. The carrier gas may include, but is not limited to, Nitrogen ($N_2$), Helium (He), Argon (Ar), Xenon (Xe), or a combination thereof, or other suitable carrier gases may be utilized as well.

As illustrated in FIG. 2, gas supply system 220 may include gas flow valves 223, 225, and 227 configured to regulate the flow rate, flow amount, or flow direction of etchant gases from gas sources 222, 224, and 226, respectively, to gas controller 228. In some embodiments, gas controller 228 may be configured to combine the various etchants and carrier gases to prepare gas mixtures having a predefined proportion of gases, and once combined, the gas mixture may be directed towards plasma etch chamber 210 through feedline 229. Although, each gas source 222, 224, and 226 are shown connected to gas controller 228, a gas source may be separately and directly connected to plasma etch chamber 210. Controller 250 may be configured to control one or more functions of gas supply system 220. For example, controller 250 may control the operation of one or more gas flow valves 223, 225, and 227, or control the operation of gas controller 228, or other functions related to gas supply system 220, as appropriate.

An exemplary plasma etch chamber 210, as shown in FIG. 2, may include an upper electrode 201, a gas showerhead 202, a wafer 203 mounted on a stage 204, a focus ring 205 adjustable along one or more of X-, Y-, or Z-axes using a focus ring position controller 206, and a lower electrode 207. The gases introduced from gas supply system 220 may be "excited" to form a plasma 208 comprising ions, free radicals, neutral species, and charged particles. In the context of this disclosure, "exciting" a gas mixture refers to subjecting the gas to an adequate electromagnetic field to extract electrons from the gas atoms, thereby ionizing the gas and forming a plasma.

Plasma etch chamber 210 may include upper electrode 201 and lower electrode 207. In a capacitively coupled plasma reactor such as apparatus 200 of FIG. 2, upper electrode 201 may be a powered electrode and lower electrode 207 may be an earthed or a grounded electrode. In some embodiments, upper electrode 201 may be grounded and lower electrode 207 may be powered. In some embodiments both upper electrode 201 and lower electrode 207 may be powered. Ions in the plasma may be accelerated toward the powered electrode and the potential difference between the plasma and the powered electrode is generally referred to as bias voltage. The configuration may be modified based on the application, or a desired mode of etching. For example, in the RIE mode, wafer 203 may be placed on a powered electrode and may experience the bias voltage. The reactive ions as well as other reactive species from the plasma may cause etching of a feature on wafer 203. In the plasma etch mode, wafer 203 may be placed on a grounded electrode and the reactive neutral species of the plasma may cause the etching.

Upper electrode 201 and lower electrode 207 may comprise electrically conductive electrodes that can be electrically biased with respect to each other to generate an electric field strong enough to ionize gases between the electrodes into a plasma. In some embodiments, upper electrode 201 or lower electrode 207 may be configured to receive an electric charge. Electrical power, generally in the form of a high-frequency (radio frequency of 13.56 MHz) RF power may be applied to upper electrode 201, lower electrode 207, or both, using power generators 260a and 260b. The powered upper electrode 201 may facilitate a uniform distribution of plasma 208 in the plasma excitation region between wafer 203 and gas showerhead 202. In some embodiments, one or both power generators 260a and 260b may be electrically coupled to upper electrode 201 and lower electrode 207, respectively, to deliver an adjustable amount of power depending on the process performed. For example, in an etching process, the power delivered to the electrodes may be adjusted to adjust the etch selectivity or etch uniformity of a layer or a feature on wafer 203.

In some embodiments, gas showerhead 202 may be configured to receive the various etchants from gas supply system 220 and disperse the various etchants into plasma etch chamber 210. Gas showerhead 202 may be designed to evenly disperse the etchants in order to maximize uniformity of process conditions including, but not limited to, plasma coverage, plasma density, plasma intensity, plasma shape, or the like. Gas showerhead 202 may comprise openings arranged unevenly or evenly in a rectangular, a triangular, a circular, a non-circular, or a spiral pattern, or a combination thereof. It is appreciated that any suitable method of dispersing the desired etchants, such as entry ports, spray nozzles, or the like may be utilized to introduce the desired etchants into plasma etch chamber 210.

Plasma etch chamber 210 may include stage 204 configured to secure wafer 203 during the etching process. In some embodiments, wafer 203 may be mounted onto a mounting surface (not shown) of stage 204. Wafer 203 may be secured on stage 204 using electrostatic forces, mechanical clamps, vacuum pressure, or a combination thereof, and may also include heating and cooling mechanisms configured to control the temperature of wafer 203 during the processes.

In some embodiments, plasma etch chamber 210 may include a focus ring 205 mounted on a focus ring holder (not shown) or stage 204. Focus ring 205 may surround wafer 203 and may have a generally annular shape. Focus ring 205 may have a rectangular cross-section, or may have an irregular cross-section or a cross-section of a different shape. In some embodiments, focus ring 205 may be made of a conductive material, a semiconductor material, a dielectric material, or another suitable material. In some embodiments, the focus ring 205 may be made of doped or undoped silicon. The focus ring holder may be connected to a focus ring position controller 206 configured to move focus ring 205 vertically along Z-axis. In some embodiments, focus ring position controller 206 may be utilized to control the vertical position of focus ring 205 during the etching process or in some embodiments a DC voltage can be applied to focus ring 205. Both the vertical position of focus ring 205 or the DC voltage applied to focus ring 205 may affect characteristics of the etching process such as including, but not limited to, etch tilt, etch uniformity, etch rate, or the like. It is appreciated that focus ring position controller 206 or focus ring DC voltage may be configured before, during, or after the etching process.

In some embodiments, apparatus 200 may include stage positioning system 230 configured to adjust a position of stage 204, thereby adjusting a position of wafer 203 secured on stage 204, along one or more of X-, Y-, or Z-axes. Stage positioning system 230 may include, but not limited to, piezo actuators, position sensors, micro-positioners, or the like, to precisely adjust the position of wafer 203 with respect to plasma 208, which may impact the etch characteristics of a feature on wafer 203. For example, adjusting the height of stage 204 such that the vertical distance between wafer 203 and upper electrode 201 is reduced, may affect the etch rate, etch profile, or etch anisotropy, or other etch characteristics. Stage positioning system 230 may communicate with controller 250 to allow controller 250 to adjust the position of stage 204 in X-, Y-, or Z-axes.

Apparatus 200 may further include vacuum system 240 configured to "evacuate" plasma etch chamber 210 to a predefined pressure. In some embodiments, vacuum system 240 may be configured to pump out air, moisture, residual gases, or the like, from plasma etch chamber 210 prior to introducing etchant gases from gas supply system 220. In some embodiments, vacuum system 240 may be further configured to "refill" plasma etch chamber 210 with ambient gas or carrier gas from gas supply system 220 to bring plasma etch chamber 210 to atmospheric pressure. Vacuum system 240 may comprise one or more vacuum pumps, pressure gauges, valves, among other components, and may be controlled using controller 250.

Apparatus 200 may further include pressure sensor 270 configured to measure gas pressure in plasma etch chamber 210 during the etching process. Etchant gases may be introduced in plasma etch chamber 210 and stabilized before igniting a plasma by subjecting the introduced gases to high potential difference between upper electrode 201 and lower electrode 207. Once stabilized, gas pressure may be maintained or adjusted during the etching process to adjust the etch characteristics including, but not limited to, etch rate, etch selectivity, etch anisotropy, etch asymmetry, or the like. Pressure sensor 270 may comprise a pressure gauge such as a bourdon tube pressure gauge, a capacitance manometer, a Pirani gauge, or the like. Pressure sensor 270 may be controlled using controller 250 and may communicate with gas supply system 220 directly or indirectly through controller 250.

Apparatus 200 may further include controller 250 configured to control gas supply system 220, stage positioning system 230, vacuum system 240, power generators 260a and 260b, pressure sensor 270, or other components, as appropriate. Controller 250 may be analogous to and may perform substantially similar functions as controller 150 of FIG. 1.

As microelectronic devices continue to shrink and process requirements become more stringent, modeling and simulation of plasma processes may offer more insight and accurate predictability of process outcomes, tighter process control, optimized tool design, among other advantages. In plasma etching processes used for semiconductor device fabrication, high etch rates, uniformity, selectivity, controlled shape of the microscopic features being etched (anisotropy), or minimal radiation damage, among other things, may be desirable. High etch rates may be desirable to increase the process throughput. Uniformity refers to achieving the same etch characteristics (rate, profile, etc.) across the wafer. Uniformity may be desirable, for example, to minimize non-uniform electrical charging of the wafer that can lead to electrical damage. Selectivity refers to the relative rate of etching of one material with respect to another. Selectivity may be desirable, for example, to etch an underlying layer without etching the material of the mask (a hard mask or a soft mask). Anisotropic etching may be desirable to fabricate features with high aspect ratios (>1).

One of several issues encountered in modeling the behavior of plasma processes is the disparity in length and time scales of plasma processes. For example, length scales range from atomistic to microscopic (feature widths) to macroscopic (reactor, wafer), and time scales range from picoseconds, to nanoseconds (response time of electrons), to microseconds (response time of ions), to several milliseconds for heavy species chemistry and gas residence times. The crosstalk between these disparate length scales may contribute to process asymmetry and overlay errors, among other things. Although existing modeling and simulation of plasma systems may provide an understanding of the physiochemical processes occurring in a plasma in a given length scale, however, the crosstalk between microscopic and macroscopic length scales is not accounted for, rendering the modeling and simulation methods inaccurate and inadequate for their desired purpose. As an example, the simulation method needs to account for the trajectory deviation of species from plasma on to the wafer due to pattern density variation, and more particularly pattern-perimeter density variations in the die. Therefore, a multi-scale etch model may be desirable to mitigate etch-induced asymmetry and to independently evaluate the effect of process parameters (wafer-scale) and pattern-perimeter density variations (die-scale) on etch characteristics.

Figure 3:
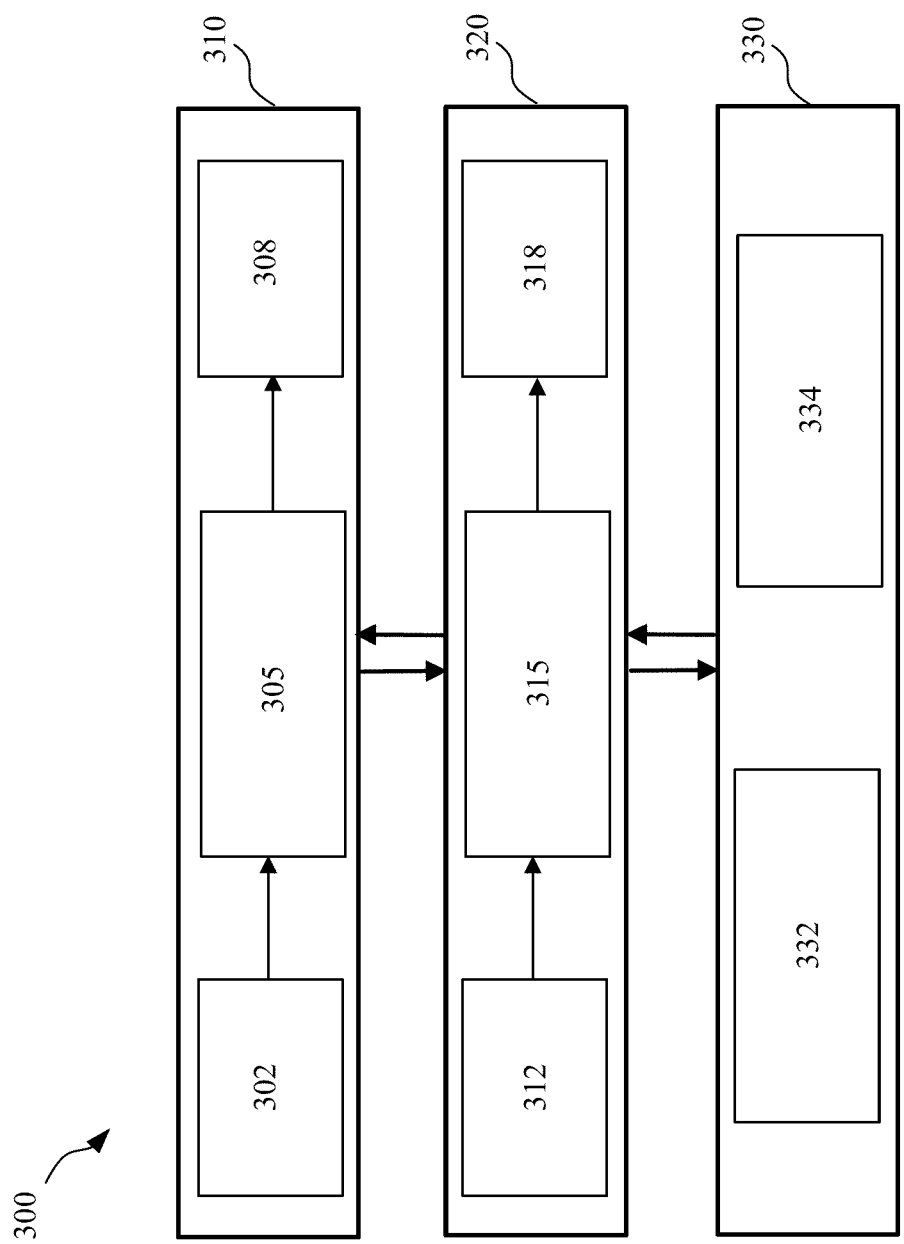
FIG. 3 illustrates a flowchart for a multi-scale plasma etch model, consistent with embodiments of the present disclosure.

Reference is now made to FIG. 3, which illustrates a flowchart for a multi-scale plasma etch model 300, consistent with embodiments of the present disclosure. Multi-scale etch model 300 may comprise a wafer-scale model 310, a die-scale model 320, and a feature-scale model 330, to generate a simulated etch profile based on the multi-scale etch model approach.

Wafer-scale model 310, also referred to as the large-scale model or the plasma sheath model, may comprise a data input module 302, a data processing module 305, and a post-process module 308. Wafer-scale model 310 may predict plasma characteristics based on a plurality of parameters including, but not limited to, chamber geometry, process conditions (operating parameters), and a location on the wafer. In plasma processing, the choice of reactor design and process parameters, among other things, may impact the plasma characteristics, and resultantly the process output. Plasma characteristics may include, but are not limited to, space and time variation of electrons, ions, and neutral species densities and velocities, ion flux, ion energy, ion angular distribution, ion trajectory, ion tilt, angle of incidence, neutral flux, radical flux, among other characteristics.

Data input module 302 may be configured to provide information associated with the chamber geometry, process conditions (operating parameters), and location on the wafer. Information associated with chamber geometry may include plasma etch chamber type, geometrical dimensions of the chamber, materials of construction, focus ring dimensions and focus ring material, position of the focus ring, voltage applied to the focus ring, operating condition of the focus ring, or the like. Information associated with the process conditions may include, but not limited to, physical etch conditions such as gas pressure, plasma power, excitation frequency, substrate voltage, gas composition and flow rate. In some embodiments, data input module 302 may be configured to provide information to data processing module 305.

In some embodiments, wafer-scale model 310 may comprise data processing module 305 configured to receive information from data input module 302. Data processing module 305 may be further configured to process the received information. Processing the received information may include performing numerical analysis of plasma sheath dynamics. Data processing module 305 may predict a plasma potential profile ($\varphi$) based on chamber geometry and process conditions.

Data processing module 305 may be configured to numerically solve one or more governing equations including the equation of motion of an ion, the equation of conservation of ion flux, and the Poisson's equation for ions, at wafer-scale to obtain the plasma potential profile ($\varphi$), ion energy, ion angular distribution, ion flux, among other things. Equations 1-3 show the governing partial differential equations (PDEs) in a plasma sheath region:

$$\frac{\partial n}{\partial t} + \nabla \cdot (n\vec{u}) = 0, \quad \text{(Eq. 1)}$$

$$\frac{\partial (n\vec{u})}{\partial t} + n(\vec{u} \cdot \vec{\nabla})\vec{u} = -\frac{en}{m}\vec{\nabla}\varphi - v_m n\vec{u}, \text{ and} \quad \text{(Eq. 2)}$$

$$\nabla^2 \varphi = \frac{e}{\varepsilon_0}\left(n - n_0 \exp\left(\frac{\varphi - \varphi_0}{T_e}\right)\right), \quad \text{(Eq. 3)}$$

where, Equation 1 represents the equation for conservation of mass, Equation 2 represents the equation for conservation of momentum, and Equation 3 represents the Poisson's equation for ions.

Assuming a steady state for ion flux, equations 1 and 2 can be rewritten as equations 4 and 5 below:

$$\nabla \cdot (n\vec{u}) = 0, \text{ and} \quad \text{(Eq. 4)}$$

$$(\vec{u} \cdot \vec{\nabla})\vec{u} = -\frac{e}{m}\vec{\nabla}\varphi - v_m \vec{u} \quad \text{(Eq. 5)}$$

In some embodiments, data processing module 305 may be configured to determine the ion velocity $\vec{u}$, plasma potential $\varphi$, and plasma sheath profile as a function of chamber geometry, different physical etch conditions such as plasma pressure, plasma power, bias voltage, focus ring height, etc., and a location (r) on wafer 203.

Post-process module 308 may perform further analysis of information obtained from data processing module 305. In some embodiments, post-process module 308 may model plasma characteristics including ion tilt, etch rate, angle of incidence at a given location (r) on a wafer (e.g., wafer 203 of FIG. 2). In some embodiments, post-process module 308 may obtain information associated with ion tilt or ion energy by tracking the trajectory of a particle such as an ion, in a given potential field using equation 6 below. The information associated with ion tilt and ion energy at a given location r in wafer-scale may serve as an input to die-scale model 320.

$$\frac{d\vec{u}}{dt} = \frac{q_i}{m_i}\vec{\nabla}\varphi \quad \text{(Eq. 6)}$$

where $q_i$ and $m_i$ are the charge and mass of an ion of the plasma.

Predicting the ion tilt using wafer-scale model 310 may be inadequate in simulating the final etch profile of a feature in a die because of the probability of crosstalk induced due to disparity in length scales between the wafer-scale and die-scale. For example, diameter of a 12-inch wafer is ~150 mm, and average dimension of a die is ~5-10 mm. Further, a trajectory of an ion as it approaches a surface of a wafer (e.g. wafer 203 of FIG. 2), may vary based on factors including, but not limited to, pattern-perimeter density and gradients in pattern-perimeter density, surface energy, among other things. For example, the ion trajectory in the plasma sheath region may be different from the ion trajectory close to the wafer surface (discussed later in reference to FIG. 6). In the context of this disclosure, "close" to the wafer surface may refer to a distance of 2 mm or less, 1 mm or less, 500 µm or less, 200 µm or less, or 100 µm or less from the wafer surface. Therefore, a die-scale model may be desirable to model the ion trajectory, or a deviation of the ion trajectory close to the wafer based on parameters associated with a die of the wafer such as pattern-perimeter density of the die.

Die-scale model 320, also referred to as the short-scale model may comprise a data input module 312 and sub-models 315 and 318. In some embodiments, data input module 312 may be configured to receive ion tilt, or ion energy information from the wafer-scale and information associated with a die including, but not limited to, pattern-perimeter density, pattern-perimeter layout, or pattern-perimeter density variation of a die. In some embodiments, the information from data input module 312 may be utilized by one or both sub-models 315 and 318 to predict the modification of ion trajectory, ion tilt, flux of ion species, neutral flux, radical flux, modified by die-scale pattern-perimeter density or pattern-perimeter density variation.

Sub-model 315 of die-scale model 320 may comprise a micro-loading model configured to model the loading effects and the impact of loading effects on local etchant availability in die-scale based on the pattern-perimeter density, or pattern-perimeter density variation in a die. Loading effects may include micro-loading and macro-loading effects. Micro-loading is a die-scale phenomenon and refers to a difference in etch characteristics of a given feature located in an area of high pattern-perimeter density (dense) compared to the same feature in an area of low pattern-perimeter density (isolated) on the same die. Generally, micro-loading is caused due to local depletion of etchant species in dense regions, thereby causing a diffusion of reactive ions along a concentration gradient within the die. Macro-loading is a wafer-scale phenomenon and refers to an overall reduction in etch rate due to overall depletion of etchant species with more exposed area to etch. For example, macro-loading effects may cause a difference in etch rates of two wafers with identical features but different etchable area. Loading effect in plasma etching of semiconductor wafers is a multi-length scale effect including micro-loading effects occurring in the length scale of 5 nanometer (nm) to 100 nm, and macro-loading effects occurring in the length scale of 100 nm to a few micrometers.

In some embodiments, predicting a characteristic of an uncharged particle such as neutrals or radicals, may include predicting a concentration gradient of an etchant between the isolated and the dense regions. The method may further include predicting a diffusion flux of the etchant based on the concentration gradient. In some embodiments, the characteristic of the uncharged particle, influenced by micro-loading effects may be predicted based on the predicted diffusion flux.

In some embodiments, predicting the concentration gradient may include predicting a first concentration of an etchant in the dense region (higher pattern-perimeter density) and predicting a second concentration of the etchant in the isolated region (lower pattern-perimeter density). In some embodiments, the predicted first and the second concentrations may be compared to determine a concentration gradient across a region of a die. The flux or the diffusion of molecules may occur from a higher concentration region to a lower concentration region.

Sub-model 318 of die-scale model 320 may comprise a die-scale charging model, also referred to as surface charging model, configured to model the modification of ion tilt, modification of ion angle distribution, or modification of ion trajectory caused by differential charging of the die surface due to pattern-perimeter density variation. The directionality difference between the positively charged ions, accelerated in the plasma sheath region, and negatively charged electrons builds charges on insulating materials such as the photoresist mask or underlying oxide layers. As an example, low pattern-perimeter density (isolated) regions may be at higher potential in comparison to higher pattern-perimeter density (dense) regions. The surface charging module predicts this imbalance in surface potential and the resulting electric fields that, for instance, can alter the trajectory of incoming ions towards the dense regions. Surface charging may vary based on factors including, but not limited to, pattern-perimeter density, pattern-perimeter density variation, or pattern-perimeter layout.

Micro-loading or surface charging effects may be expressed as a function of pattern-perimeter density at a given location having linear coordinates $(x_i, y_i)$ and a multi-scale gradient. The location $(x_i, y_i)$ may be at a distance r' from the center of the die having coordinates $(x_0, y_0)$. In some embodiments, the etchant concentration gradient may be represented as in equation 7 below:

$$\nabla C = a_0 + \Sigma a_i \nabla(G_i * \rho(r'))  \quad\quad (\text{Eq. 7})$$

where, C is the etchant concentration, $a_0$ and $a_i$ are constants associated with multi-length scales of loading effects (including micro-loading and macro-loading effects), $\rho(r')$ is the local pattern density at location r', $G_i$ is a Gaussian kernel, and $\nabla(G_i * \rho(r'))$ is the multi-scale gradient of local pattern density.

In some embodiments, the electric potential gradient resulting from differential surface charging effect may be represented as in equation 8 below:

$$\nabla V = b_0 + \Sigma b_i \nabla(G_i * \rho(r'))  \quad\quad (\text{Eq. 8})$$

where, V is the voltage (surface potential) at the surface of the die, $b_0$ and $b_i$ are constants associated with multi-length scales of surface charging effects, $\rho(r')$ is the local pattern density at location r', $G_i$ is a Gaussian kernel, and $\nabla(G_i * \rho(r'))$ is the multi-scale gradient of local pattern density.

In some embodiments, the gradient can be calculated based on time-dependent etch load. In some embodiments, the time dependent etch load is a function of pattern-perimeter map and aspect ratio dependent etch. The diffusion equation can be solved as, $$\frac{\partial C}{\partial t} - div(D * grad(C)) = 0$$

with the following boundary condition $D*grad(C) = -q(r)$, where C is the concentration of species, D is the diffusion coefficient q(r) is the etchant consumption rate obtained using multiscale gradient convolution $$D \times grad(C) = \alpha_0 + \Sigma \alpha_i \nabla(G_i * L(r,t)),$$

where G is a gaussian kernel and L(r,t) is time dependent etch load

Etch load, $L(r,t) = \rho 0(r) \times (1 + tE(a))$, and where $\rho 0$ is the pattern-perimeter map of the mask and E(a) is aspect ratio dependent etch rate and a is the aspect ratio.

Multi-scale plasma etch model 300 may further comprise feature-scale model 330. In some embodiments, feature-scale model 330 may be configured to obtain information from die-scale model 320 and simulate an etch profile, etch asymmetries, or the like based on the obtained information associated with the pattern-perimeter density and pattern-perimeter density variation of the die. Feature-scale model 330 may include a physical etch model 332 or a data-driven etch model 334 to simulate after-etch profiles and etch process asymmetries based on pattern-perimeter density or pattern-perimeter density variation.

Using the multi-scale model, the etch process asymmetry at feature-scale may be determined based on the process asymmetry predicted using wafer-scale model 310 and the modification of characteristics of ions, neutrals or radicals in plasma based on the die-scale model 320. The modification of characteristics may include local perturbations at feature scale due to short length scale effects including differential surface charging effects, micro-loading effects. The local perturbations may be determined based on the pattern-perimeter density and a gradient of the pattern-perimeter density. The overall process asymmetry at feature scale may be represented as in equation 9 below:

$$A(r+r') = g((\varphi_r, \rho_0(r'), \nabla \rho 0(r'))  \quad\quad (\text{Eq. 9})$$

where, A is the overall process asymmetry, $\varphi_r$ is the ion tilt at a given location r in wafer-scale, $\rho 0(r')$ is the local pattern-perimeter density at location r', and $\nabla \rho 0(r')$ is the gradient of pattern-perimeter density at location r'.

Figure 4A:
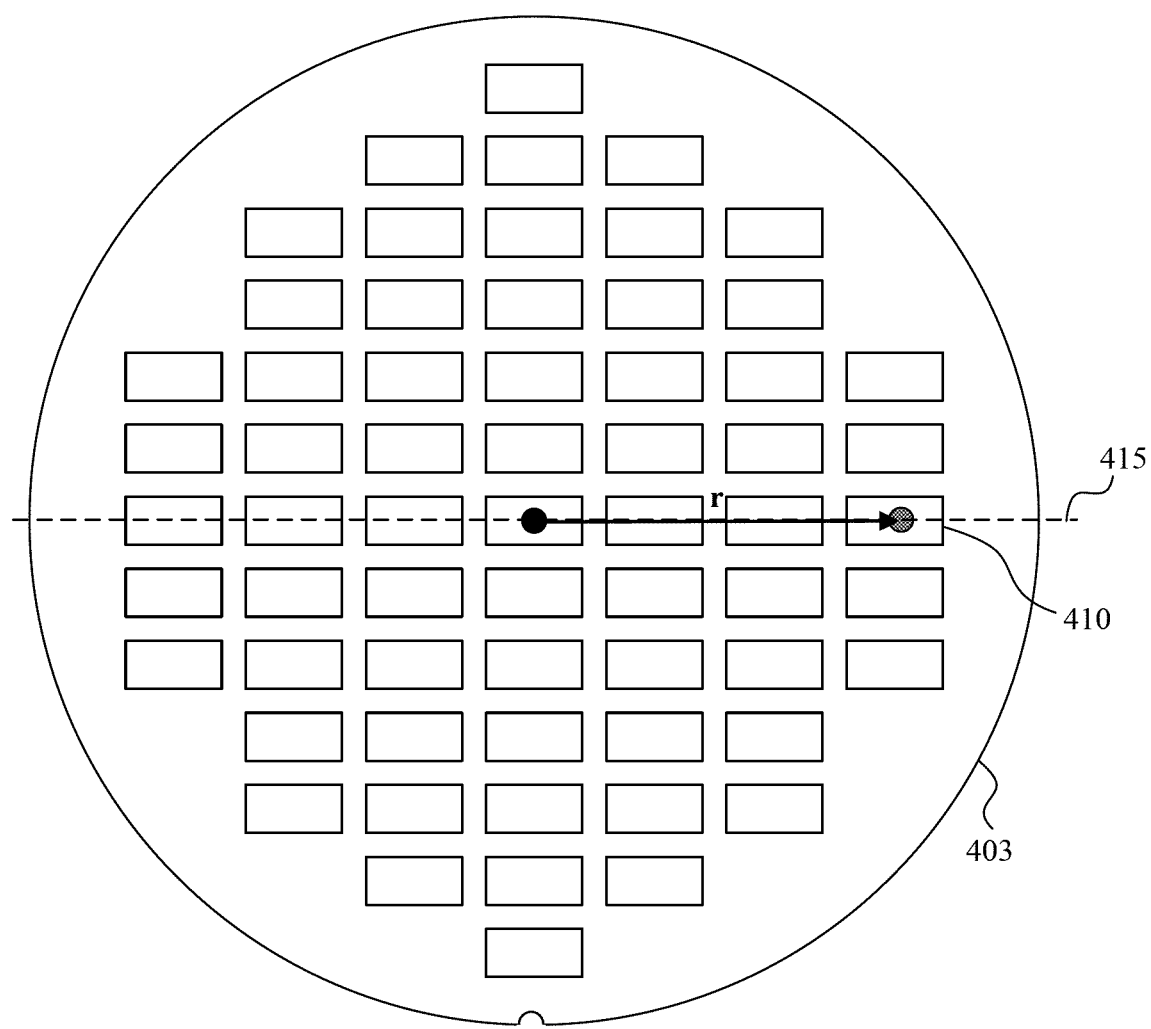
FIGS. 4A and 4B illustrate a top view and a cross-section view, respectively, of a wafer configured to be exposed to a plasma, consistent with the embodiments of the present disclosure.
Figure 4B:
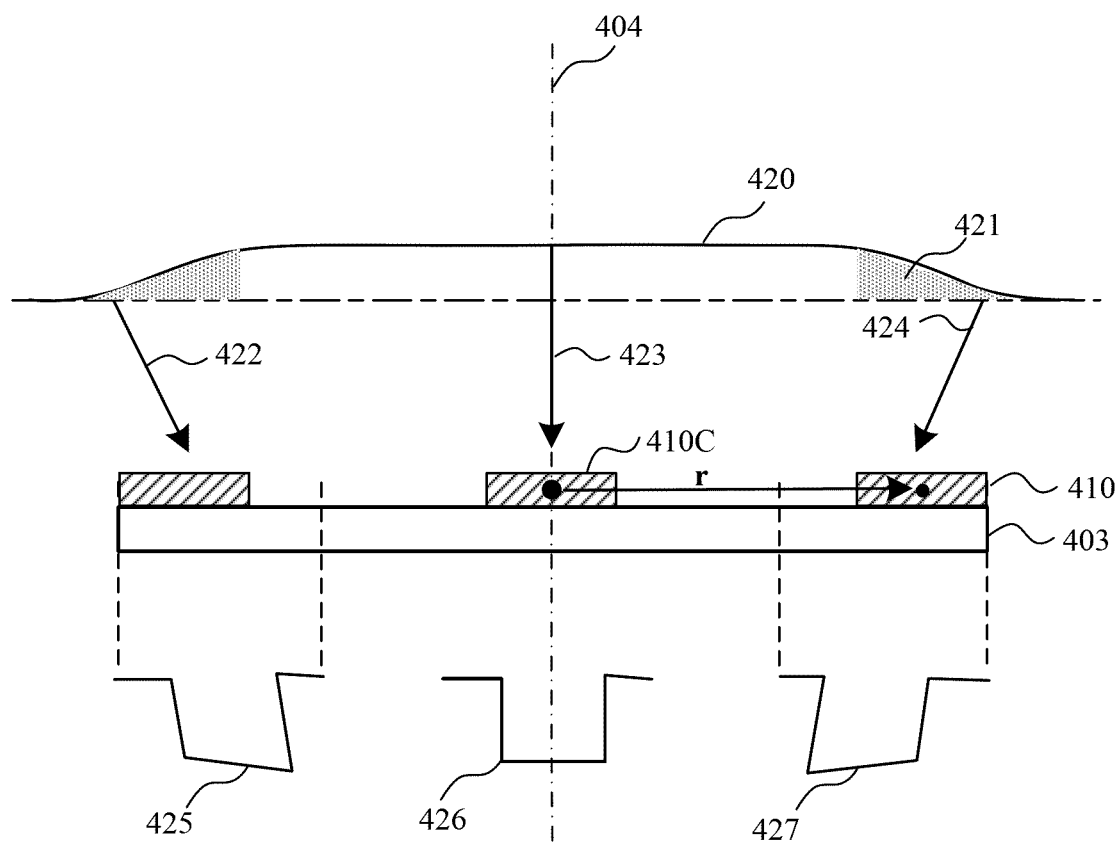

Reference is now made to FIGS. 4A and 4B, which illustrate a top view and a cross-section view, respectively, of wafer 403 configured to be exposed to a plasma (e.g., plasma 208 of FIG. 2), consistent with the embodiments of the present disclosure. As shown in FIG. 4A, Die 410 may be fabricated on wafer 403 using semiconductor fabrication and processing methods, or microelectromechanical systems (MEMS) fabrication techniques. Wafer 403 may comprise a substrate for fabrication of microelectronic components of an integrated chip, and may be made from a semiconducting material including, but not limited to, silicon (Si), germanium (Ge), gallium arsenide (GaAs), or the like. In some embodiments, wafer 403 may be made of a insulating material such as silicon dioxide ($SiO_2$), glass, ceramics, or the like.

Wafer 403 may comprise more than one die fabricated in a repeating pattern along X- and Y-axes. In the context of this disclosure, a "die" may refer to a block of semiconducting material (e.g., wafer 403) on which a functional integrated circuit is fabricated. Die 410 may comprise electronic components including, but not limited to, semiconducting devices such as Metal-Oxide-Semiconductor Field Effect Transistors (MOSFETs), capacitors, diodes, resistors, among other devices. In some embodiments, more than one die on wafer 403 may have a similar die pattern as die 410. Die pattern, as used herein, refers to the layout of devices and circuitry within a die. It is appreciated that dies may have dissimilar patterns as well, based on the desired function and application.

FIG. 4B illustrates a cross-section view of wafer 403 comprising die 410, along cross-section 413 of FIG. 4A. Wafer 403 may be placed on a stage (e.g., stage 204 of FIG. 2) in a plasma reactor (e.g., plasma etch chamber 210 of FIG. 2) to perform plasma etching. In semiconductor fabrication and processing, plasmas are used, for example to "dry" etch features with vertical sidewalls and high aspect ratios into materials such as silicon, silicon dioxide, or glass. In the context of this disclosure, aspect ratio refers to a ratio of depth to width of a feature. For example, aspect ratio of a trench 200 μm wide and 4 mm deep is 20. Plasma etching or dry etching, in comparison to wet etching, may be desirable to obtain anisotropic etch profiles, among other things.

During plasma etching, wafer 403 may be subjected to a plasma having a plasma sheath region 421 formed at the interface between plasma and an electrode, a chamber wall, or a sample (e.g., wafer 403). A plasma sheath region may be a dark, electron-depleted, positively-charged, boundary region containing positive ions and neutral species. The plasma sheath region is formed because electrons in a plasma are more mobile (higher temperature and lower mass) than ions, and consequently, escape from plasma at much faster speed than ions if there is no confining potential barrier. Positive charges in the plasma sheath region can prevent more positive ions from diffusing out of the plasma, and can also create a potential barrier to prevent electrons from diffusing out of the plasma. A plasma sheath may also create a positive plasma potential with respect to the grounded chamber walls, or grounded electrode, or the sample. FIG. 4B shows a plasma potential profile 420 including plasma sheath region 421, and ion trajectories 422, 423, and 424 directed towards wafer 403.

As shown in FIG. 4B, ion trajectories 422 and 424 originating from plasma sheath regions 421 may be different from ion trajectory 423 originating from a uniform potential regions of the plasma. Ion trajectory 423 may be substantially perpendicular to a surface of wafer 403, or a center die 410C fabricated on wafer 403. Ion trajectories 422 and 424 may be incident on die 410 at a non-zero angle with respect to center axis 404. Because the etchant ions have different trajectories, the etch characteristics including, but not limited to, etch profile, etch rate, etch anisotropy, or etch asymmetry of features may be different. In some embodiments, etch profile of a feature may be based on the location of the die on wafer 403.

As an example, etch profiles 425 and 427 of a feature 408 of peripheral dies 410 may be asymmetrical in comparison to the etch profile 426 of center die 410C. Etch profiles 425 and 427 illustrate after-etch inspection (AEI) profiles of feature 408 of peripheral dies 410 located at a radial distance r from a centerpoint (X=0, Y=0). Etch profile 426 illustrates an AEI profile of feature 408 of center die 410C.

Figure 5:
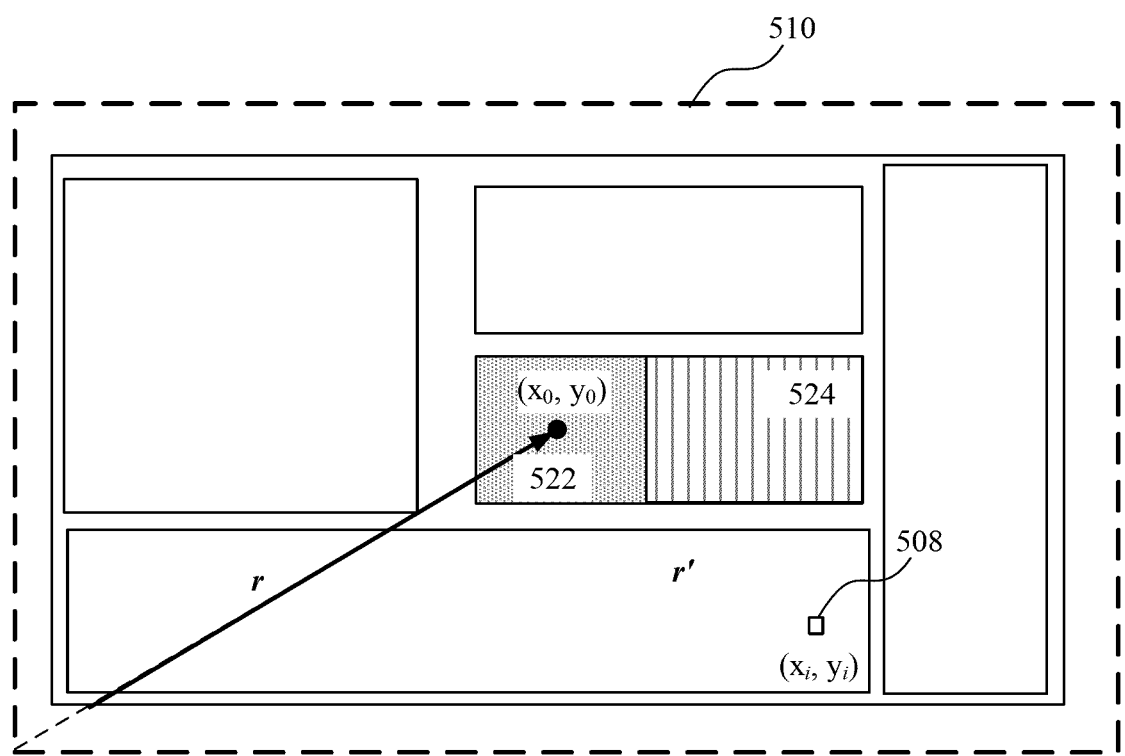
FIG. 5 illustrates a schematic of a die located at a radial distance r from the center of the wafer, consistent with embodiments of the present disclosure.

Reference is now made to FIG. 5, which illustrates a schematic of a die located at a radial distance r from the center of the wafer, consistent with embodiments of the present disclosure. Die 510 may comprise a peripheral die on a wafer (e.g., wafer 403 of FIG. 4A), and may be substantially similar to peripheral die 410 of FIG. 4B. Die 510 may be located at a radial distance r measured from the center of the wafer to center of die 510 having local coordinates ($x_0$, $y_0$). Die 510 may include an exemplary feature 508, analogous to feature 408 of FIG. 4A. The location coordinates of feature 508 may be represented using linear coordinates ($x_i$, $y_i$) at a distance r' from ($x_0$, $y_0$). It is appreciated that although die 510 is illustrated as including feature 508, it may comprise a plurality of features similar or dissimilar to feature 508.

Die 510 may comprise microelectronic devices including, but not limited to, transistors, diodes, resistors, capacitors, and circuitry comprising microelectronic devices arranged in a pattern or a layout. In some embodiments, the pattern or the layout may be predetermined based on the application. Pattern density of a die refers to the number of devices in a unit area of the die. Based on the arrangement of devices, die 510 may comprise regions having a high pattern density (e.g., dense region 522), or regions having a lower pattern-perimeter density (e.g., isolated region 524). Although not explicitly illustrated in FIG. 5, it is appreciated that there may be one or more regions with intermediate or varying density levels within a die.

In some embodiments, information associated with pattern-perimeter density of a die or pattern-perimeter density variation across a die may be represented in a corresponding pattern-perimeter density map indicating the physical layout of devices. Information associated with a pattern-perimeter density map of die 510, in combination with information associated with ion tilt, ion angle, ion energy, flux at wafer scale from wafer-scale model 310, may be used by die-scale model 320 to simulate the characteristics of an ion, neutral or radicals in the plasma. The ion characteristics derived from die-scale modeling may include, but are not limited to, modification of ion tilt, modification of ion energy, modification of flux of ions, modification of ion angular distribution, modification of neutral flux, modification of radical flux or the like, based on one or both of micro-loading effects and surface charging effects.

Figure 6:
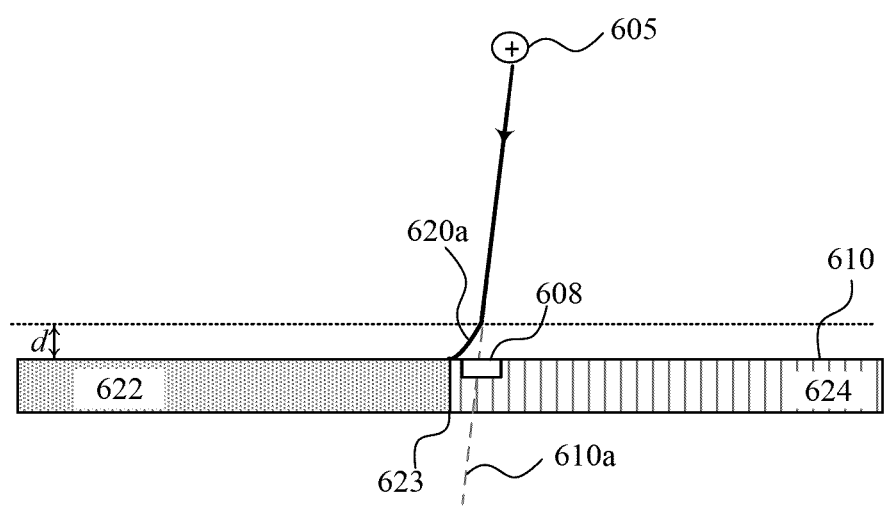
FIG. 6 illustrates a deviation of ion trajectory at a junction between the dense and isolated regions of a die, consistent with embodiments of the present disclosure.

Reference is now made to FIG. 6, which illustrates a deviation of ion trajectory at a junction between the dense and isolated regions of a die, consistent with embodiments of the present disclosure. Die 610 may comprise a dense region 622, an isolated region 624, and a junction region 623 between the dense and the isolated regions. In some embodiments, ion 605 in a plasma may be directed toward die 610 along an initial path or an initial ion trajectory 610a. Ion 605 or an ion beam (not shown) comprising a plurality of ions may be incident on feature 608 located in isolated region 624. As ion 605 approaches the surface of feature 608, differential surface charging effects may cause a deviation of ion trajectory from initial ion trajectory 610a to final ion trajectory 620a "close" to the incident surface. The deviation of ion trajectory may occur or initiate at a distance d from the incident surface, and may be in a range of 2 mm or less, 1 mm or less, 500 μm or less, 200 μm or less, or 100 μm or less from the incident surface.

Figure 7A:
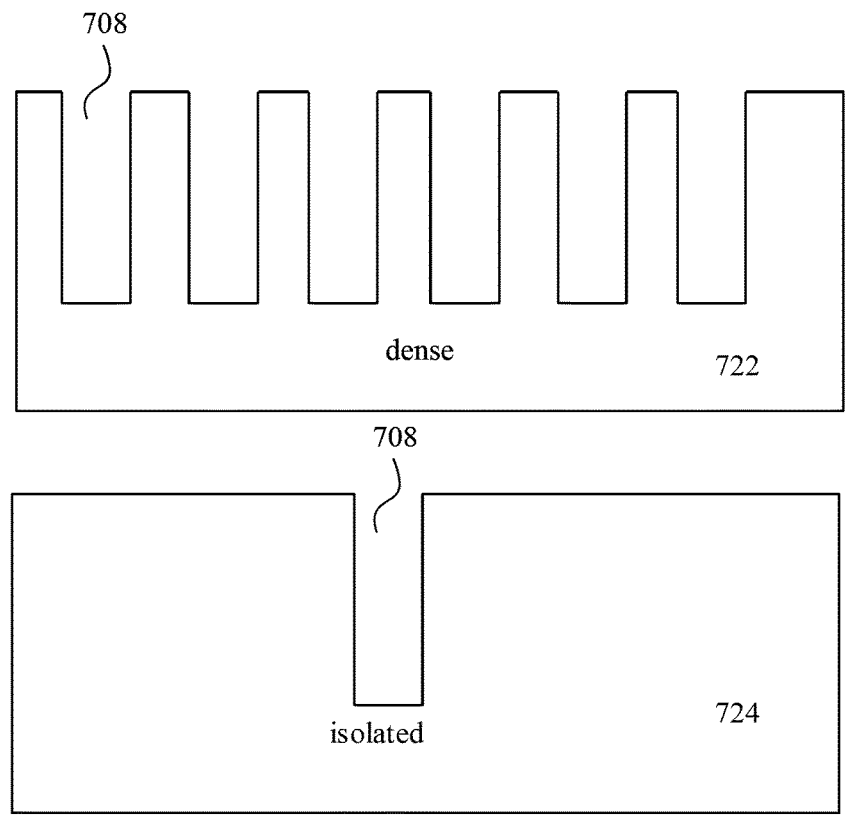
FIG. 7A illustrates a schematic of a dense region and an isolated region of a die, consistent with embodiments of the present disclosure.
Figures 7B, 7C:
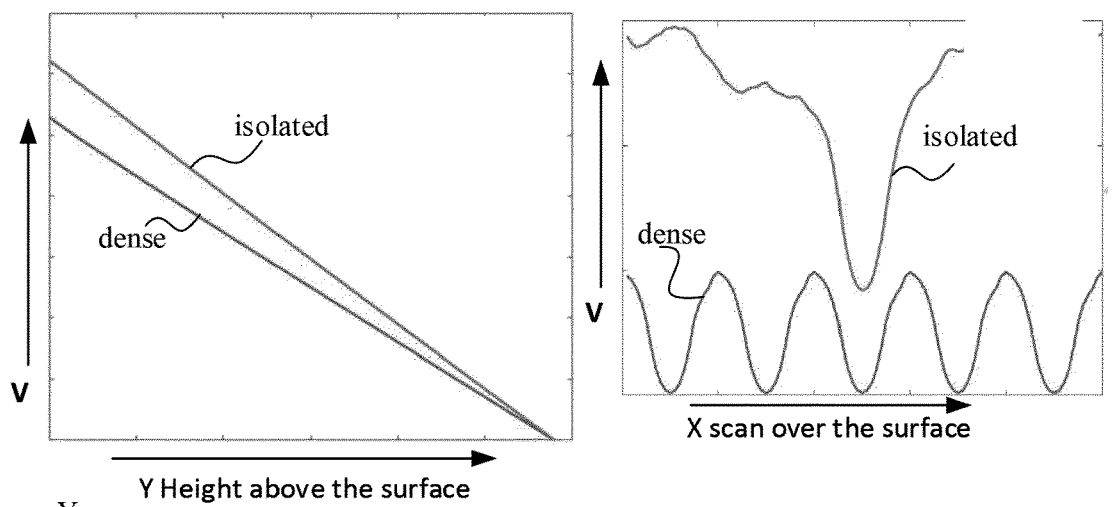
FIGS. 7B and 7C illustrate a plot of simulated differential surface charging effects on dense and isolated regions of a die, consistent with embodiments of the present disclosure.

Reference is now made to FIGS. 7A-7C, which illustrate the schematics of a high pattern-perimeter density and a low pattern-perimeter density regions comprising a feature and differential surface charging effects, consistent with embodiments of the present disclosure.

FIG. 7A illustrates a schematic of a dense region (high pattern-perimeter density) 722, analogous to dense regions 522 and 622 of FIGS. 5 and 6, respectively, and a schematic of an isolated region (lower pattern-perimeter density) 724, analogous to isolated regions 524 and 624 of FIGS. 5 and 6, respectively. Dense region 722 may comprise a plurality of features 708 arranged in a repeating manner, for example, a matrix, an array, a pattern, or randomly arranged. Isolated region 724 may comprise fewer features in comparison to dense region 722. Feature 708 may include, but is not limited to, an alignment mark, a trench, a metal contact pad, a transistor gate, a via, or other such feature.

FIG. 7B illustrates a plot of simulated differential surface charging effect for dense and isolated regions using a die-scale model, consistent with embodiments of the present disclosure. As shown in FIG. 7B, isolated region 724 is at a higher potential in comparison to dense region 722 at any given distance above the incident surface. The surface and sidewalls of dense region 722 are mostly charged negative by the electrons while most of the positively charged ions escape into the trench since the latter has more anisotropic angular distribution. The isolated region 724 receives equal current of electrons and ions averaged over an RF cycle. This differential charging of the dense and isolated surface may generate a surface potential measured in Volts (V), represented on the Y-axis of the plot.

FIG. 7C illustrates a plot of simulated differential surface charging effect for dense and isolated regions using a die-scale model, consistent with embodiments of the present disclosure. As shown in FIG. 7C, the surface potential of isolated region 724 is higher in comparison to dense region 722 at any given point across the incident surface. The surface and sidewalls of dense region 722 are mostly charged negative by the electrons while most of the positively charged ions escape into the trench since the latter has more anisotropic angular distribution. The isolated region 724 receives equal current of electrons and ions averaged over an RF cycle. This differential charging of the dense and isolated surface may generate a surface potential measured in Volts (V), represented on the Y-axis of the plot.

Figure 8A:
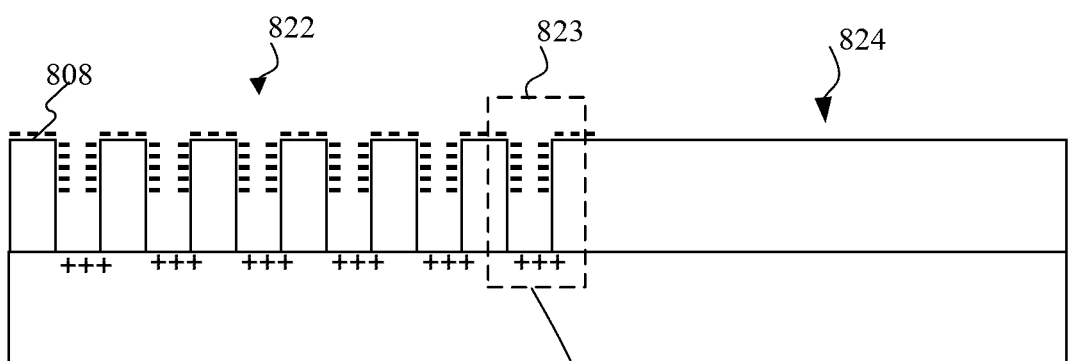
FIG. 8A illustrates a schematic of a region of a die comprising a high pattern-perimeter density region, a low pattern-perimeter density region, and a junction region, consistent with embodiments of the present disclosure.
Figure 8B:
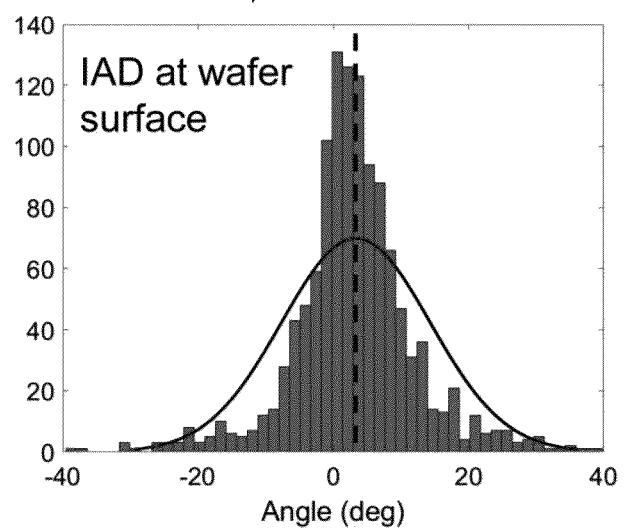
FIG. 8B illustrates a plot of a simulated ion angular distribution on a high pattern-perimeter density region of a die, consistent with embodiments of the present disclosure.

Reference is now made to FIGS. 8A and 8B, which illustrate the schematics of high pattern-perimeter density and low pattern-perimeter density regions, and the ion angular distribution in a high pattern-perimeter density region, consistent with embodiments of the present disclosure.

FIG. 8A illustrates a schematic of a region of a die comprising a high pattern-perimeter density region 822, a low pattern-perimeter density region 824, and a junction region 823. High pattern-perimeter density region 822 may comprise one or more features 808. Low pattern-perimeter density region 824 may comprise none or fewer features in comparison to high density region 822.

Figure 9:
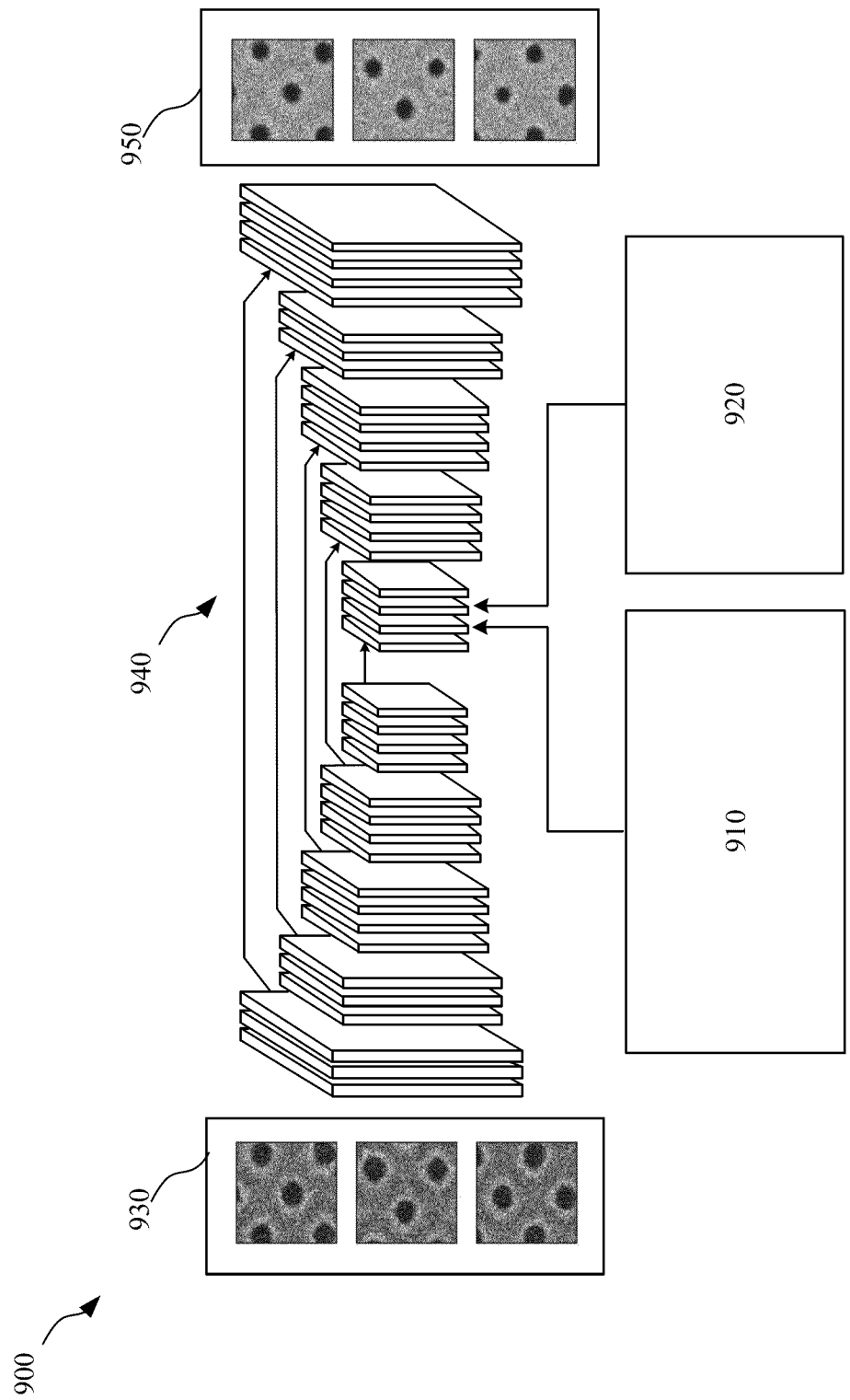
FIG. 9 illustrates a plasma simulation system comprising a data-driven model for simulating a plasma etch process, consistent with embodiments of the present disclosure.

FIG. 8B illustrates the simulated modified ion angular distribution of incident ions on the surface of the die at junction region 823. The ion angular distributions may be represented as a normal, a standard, or a Gaussian distribution function. FIG. 8B illustrates the modified ion angular distribution of ions incident on the surface of the die at junction region 823, and the mean (or the median or the mode) of the ion angle may be modified by a finite positive offset. A die-scale model (e.g., die-scale model 320 of FIG. 3) may be configured to simulate the modification of ion angular distribution based on pattern-perimeter density. In some embodiments, die-scale model 320 may be further configured to simulate modification of more than one characteristic of the particles of the plasma including, but not limited to, ion tilt, ion angular distribution, ion trajectory, ion flux, ion energy, Reference is now made to FIG. 9, which illustrates a plasma simulation system 900 comprising a data-driven model for simulating a plasma etch process, consistent with embodiments of the present disclosure. Plasma simulation system 900 may include a wafer-scale model 910, a die-scale model 920, training image 930, a machine learning network 940, trained image 950. It is appreciated that simulation system 900 may comprise other relevant components (not illustrated) as well.

Wafer-scale model 910 may be substantially similar to and may perform substantially similar functions as wafer-scale model 310 of FIG. 3. Wafer-scale model 910, analogous to wafer-scale model 310, may comprise a data input module, a data processing module, and a post-process module. Wafer-scale model 910 may be configured to predict a plasma characteristic including, but not limited to, ion tilt, ion trajectory, ion angular distribution, or ion flux, based on the information obtained from data input module such as process conditions for etch, chamber geometry, etc. Wafer-scale model 910 may be further configured to predict, for example, ion tilt at a given location on a wafer (e.g., wafer 403 of FIG. 4) located at a radial distance r from the center of the wafer. In some embodiments, information associated with the predicted plasma characteristic using wafer-scale model 910 may be stored in a storage module (not shown) of machine learning network 940.

Die-scale model 920 may be substantially similar to and may perform substantially similar functions as die-scale model 320 of FIG. 3. Die-scale model 920, analogous to die-scale model 320, may comprise a data input module, and one or more sub-modules for modeling the micro-loading effects and the differential surface charging effects based on a pattern-perimeter density, or pattern-perimeter density variation, or pattern layout of the die. Die-scale model 920 may be configured to predict a modification of the plasma characteristic predicted from wafer-scale model 920 based on the pattern-perimeter density map, or pattern-perimeter density variation map. In some embodiments, die-scale model 920 may be configured to store information associated with the predicted modification of the plasma characteristic in a storage module of machine learning network 940.

In some embodiments, plasma simulation system 900 may be an automated machine learning network trained to receive or extract training image 930 from a database, unprompted. Training image 930 may be an after-develop image of a feature, or an after-develop image of a region of interest on a wafer (e.g., wafer 403 of FIG. 4), or may include a plurality of after-develop images of a feature. Training image 930 may be acquired using an image acquirer of an inspection system. After receiving or acquiring training image 930 or information associated with training images 930, machine learning network 940 may extract relevant trained features, unprompted. The extracted trained features may be stored in a storage module (not shown) or temporarily stored in a repository (not shown). The storage module may be accessed by machine learning network 940, or a user of plasma simulation system 900.

In some embodiments, machine learning network 940 may be configured to extract feature information from training image 930. Machine learning network 320 may also extract relevant features from information file comprising GDS format files or OASIS format files. Machine learning network 940 may include, for example, an artificial intelligence system, a neural network, a convolutional encoder-decoder, or a deep-learning technique, a software implemented algorithm, or the like. The feature extraction architecture of machine learning network 940 may comprise a convolutional neural network, for example. In some embodiments, a linear classifier network of deep learning architecture may be adopted as a starting point to train and build feature extraction architecture of machine learning network 940.

In some embodiments, machine learning network 940 may include a pattern-perimeter extractor (not shown) configured to extract information or pattern-perimeters from training image 930. Pattern-perimeter extractor may be a mathematical algorithm, a software-implemented algorithm, image processing algorithm, or the like. Pattern-perimeter extractor may be integrated into an image acquirer (not shown) or may be configured to operate as a separate, stand-alone unit configured to process training image 930. In some embodiments, pattern-perimeter extractor may comprise an image processing unit (not shown) configured to adjust brightness, contrast, saturation, flatness, noise filtering, etc. of training image 930 prior to storage in storage module of machine learning network 940.

In some embodiments, machine learning network 940 may further comprise an image acquirer, image enhancer, display device, or the like. Machine learning network 940 may be configured to extract the pattern-perimeter information from training image 930 and to receive information associated with predicted plasma characteristics from wafer-scale model 910 and die-scale model 920.

In some embodiments, machine learning network 940 may be further configured to generate trained image 950 based on the information from training image 930, wafer-scale model 910, and die-scale model 920. Trained image 950 may comprise a simulated after-etch image based on the predicted etch profile of a feature using wafer-scale model 910 and die-scale model 920. Trained image 950, representing a simulated etch characteristic of a feature after stripping the photoresist, may be reviewed by multiple reviewers or users requesting the information. In some embodiments, trained image 950 may be retrieved by a user prompt at a later time for review and in-depth analysis. Trained image 950 may be stored in a suitable format, for example, a Joint Photographic Experts Group (JPEG) file, a Portable Network Graphic (PNG) file, a Portable Document Format (PDF) file, a Tagged Image File Format (TIFF) file, or the like.

Figure 10:
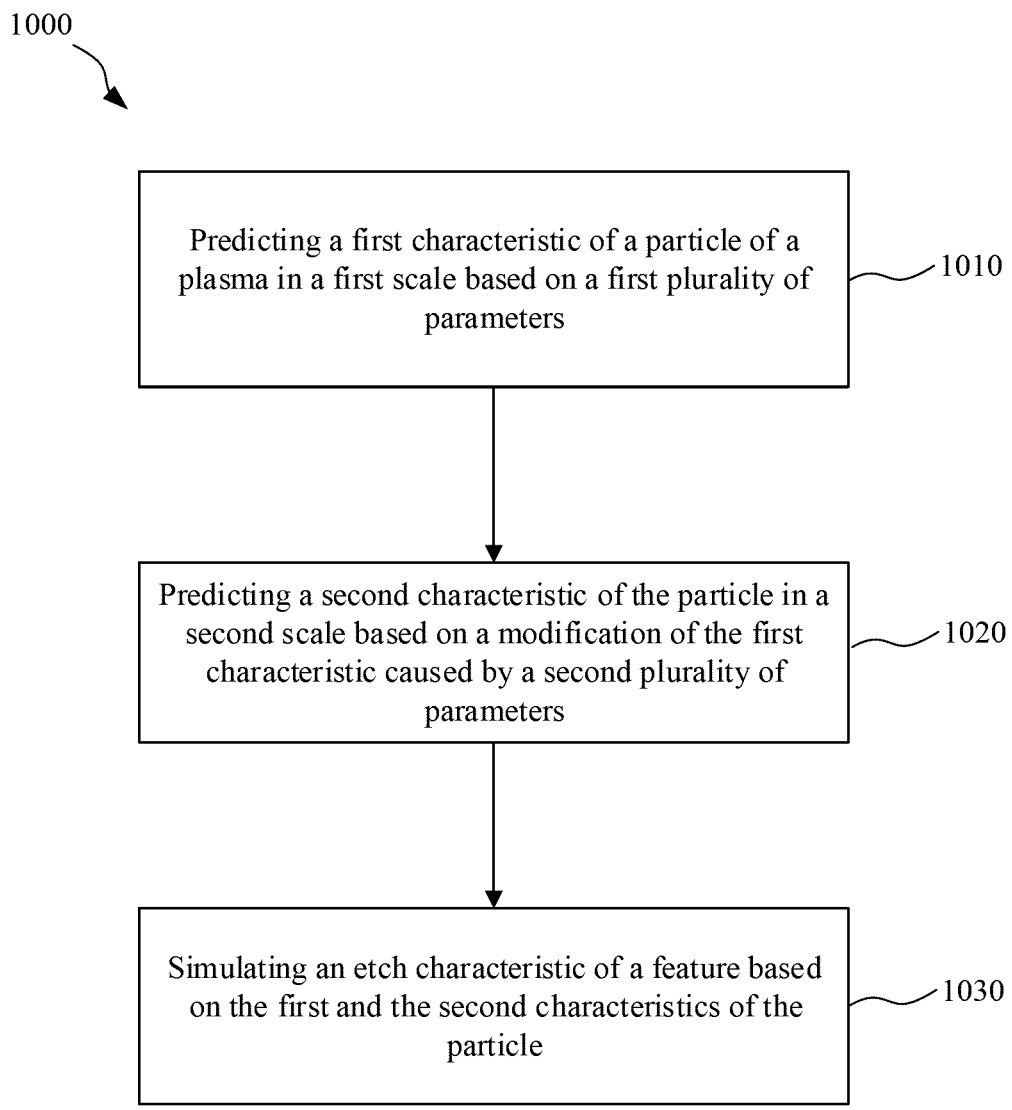
FIG. 10 illustrates a process flowchart of an exemplary simulation method for simulating a plasma etch process, consistent with embodiments of the present disclosure.

FIG. 10 is a process flow chart illustrating an exemplary simulation method 1000 for simulating a plasma etch process, consistent with embodiments of the present disclosure. The simulation method may be performed using a physical etch model (e.g., multi-scale plasma etch model 300 of FIG. 3) in a plasma process simulation system (e.g., plasma process simulation system 100 of FIG. 1). For example, a processor (e.g., processor 180 of FIG. 1) may include the modeling program or algorithm and may be programmed to implement the simulation method. It is appreciated that steps performed in simulation method 1000 may be reordered, added, removed, or edited, as appropriate.

In step 1010, the simulation method may include predicting a first characteristic of a particle of a plasma in a first scale based on a first plurality of parameters. Plasma may be a neutral ionized gas comprising positively charged ions (etchant species), free radicals, neutral species, or electrons. The first characteristic may comprise a physical characteristic of the particle such as ion tilt, ion energy, ion trajectory, ion flux, ion angular distribution, among other characteristics. The first scale may be a wafer-scale having dimensions up to 400 mm. The first plurality of parameters may comprise chamber geometry, process conditions, or a wafer location. A wafer-scale model (e.g., wafer-scale model 310 of FIG. 3) may be used to predict the first characteristic of the plasma in wafer-scale.

In some embodiments, predicting a plasma characteristic such as ion tilt, for example, may include predicting a plasma sheath profile in wafer-scale using the wafer-scale model. A data processing module (e.g., data processing module 305 of FIG. 3) of wafer-scale model 310 may be configured to receive information associated with the plasma processing chamber and process conditions. The data processing module may be further configured to predict a profile of plasma potential in the plasma sheath region based on the plasma processing chamber geometry and process conditions. Predicting the ion tilt at a location on the wafer at a radial distance r may further include tracking the trajectory of the ion in the presence of electric potential gradient. The wafer-scale model may also be configured to predict plasma characteristics such as ion angle distribution, ion energy, ion flux, ion trajectory, or the like.

In step 1020, the simulation method may include predicting a second characteristic of the particle in a second scale based on a modification of the first characteristic caused by a second plurality of parameters. The second scale may include a die-scale having dimensions in the range of 5 mm-20 mm or more. A die (e.g., peripheral die 410 of FIG. 4A) may include a plurality of features having dimensions in the range of 5 nm-100 μm or more. A die-scale model (e.g., die-scale model 320 of FIG. 3) may be configured to receive one or more of the first characteristic of the plasma and predict one or more of the second characteristics in die-scale.

The second characteristic may include a modification of ion tilt, ion energy, ion trajectory, ion flux, ion angular distribution, neutral flux, radical flux, among other characteristics. In some embodiments, the second characteristic of the particles may comprise a physical characteristic of the plasma particles in one or more scales such as wafer-scale, die-scale, or feature-scale. The modification of characteristics of an ion in a plasma approaching a surface of a feature on a die may be caused by factors including, but not limited to, pattern-perimeter density, pattern-perimeter density variation, or pattern-perimeter layout, among other factors. For example, differential surface charging effects due to pattern-perimeter density variation may modify the ion tilt, ion trajectory, ion angular distribution, ion energy, or ion flux of the incident ions. As a different example, micro-loading effects due to pattern-perimeter density variation may modify the flux of neutrals or radicals incident on the die surface. The die-scale model may be configured to predict the modification of plasma characteristics from wafer-scale based on a location r' of the feature with respect to the center of the die ($x_0$, $y_0$).

In some embodiments, predicting the modification of plasma characteristics as the ion approaches the die surface may include accessing a pattern-perimeter layout of the die. The pattern-perimeter layout may include a pattern-perimeter density map or a pattern-perimeter density variation map. The pattern-perimeter density map may comprise regions of high pattern-perimeter density (dense regions) and lower pattern-perimeter density (isolated regions) based on the die design for a desired application. The die-scale model may predict the modification of plasma characteristics based on the pattern-perimeter density map or the pattern-perimeter density variation map.

In the die-scale model, predicting the modification of plasma characteristics based on the pattern-perimeter density map or the pattern-perimeter density variation map may include identifying a first region of the die having a first pattern-perimeter density and a second region of the die having a second pattern-perimeter density different from the first pattern-perimeter density. The first and the second regions may include the dense and the isolated regions, respectively. It is appreciated that the first and the second regions may include the isolated and the dense regions, respectively, as well.

Upon accessing the pattern-perimeter density map, the die-scale model may predict a concentration gradient of etchants (neutrals or radicals) based on the identified dense and the isolated regions. The concentration gradient, caused by the higher consumption of etchants in dense regions compared to isolated regions, may influence diffusion of the etchants from isolated to dense regions on the die surface. The die-scale model may predict the modification of plasma characteristics at a location r' based on the neighboring patterns, pattern-perimeter density, or pattern-perimeter density variation.

In step 1030, the simulation method may include simulating an etch characteristic of a feature based on the first and the second characteristics of the charged particle predicted from the wafer-scale and the die-scale model. In some embodiments, simulation method may further include simulating the etch characteristic based on one or more physical characteristics of the plasma particles, or based on a physical characteristic in one or more scales. The multi-scale plasma etch model comprising the wafer-scale and the die-scale model may be configured to simulate an etch characteristic including, but not limited to, etch profile, etch rate, etch uniformity, etch selectivity, or the like, of a feature on the die. In some embodiments, the simulation method may generate an image of the simulated etch characteristic, or generate information associated with the simulated etch characteristic in a graphic format or a tabulated format, or other formats.

Figure 11:
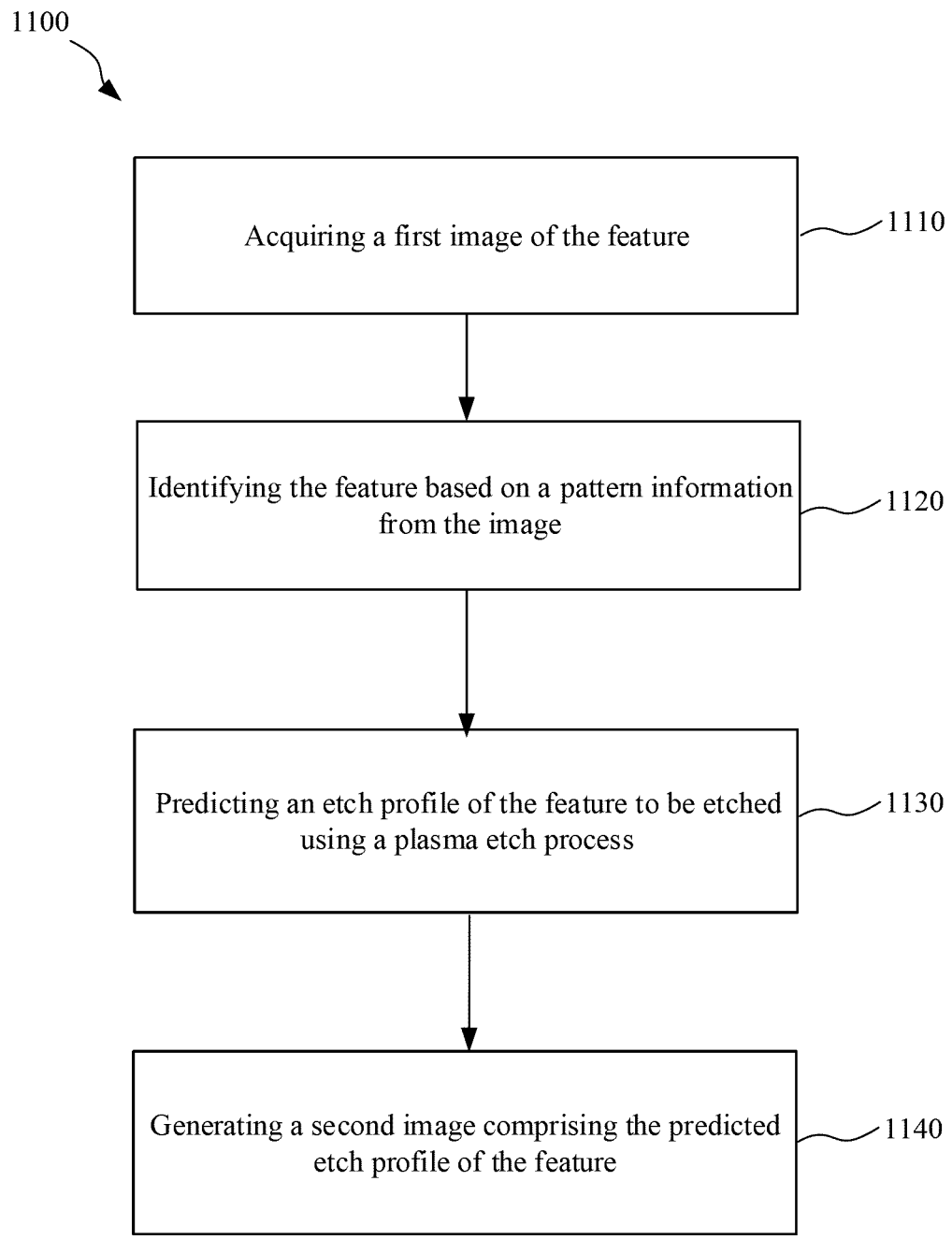
FIG. 11 illustrates a process flowchart of an exemplary simulation method for simulating a plasma etch process, consistent with embodiments of the present disclosure.

Reference is now made to FIG. 11, which illustrates a process flowchart illustrating an exemplary simulation method 1100 for simulating a plasma etch process using a data-driven model, consistent with embodiments of the present disclosure. The simulation method may be performed using a data-driven etch model (e.g., data-driven etch model 334 of FIG. 3) in a plasma process simulation system (e.g., plasma process simulation system 100 of FIG. 1). For example, a processor (e.g., processor 180 of FIG. 1) may include the modeling program or algorithm and may be programmed to implement the simulation method. It is appreciated that steps performed in simulation method 1100 may be reordered, added, removed, or edited, as appropriate.

In step 1110, the simulation method may include acquiring a first image of the feature. The first image may comprise a training image (e.g., training image 930 of FIG. 9) an after-develop image of the feature, or a plurality of after-develop images. The image(s) may be acquired, retrieved, accessed, or obtained from a database, a storage module, or in some cases from an image acquirer of an optical inspection system in real-time.

In step 1120, the simulation method may include identifying the feature based on a pattern-perimeter information from the acquired training image. The pattern-perimeter information may be extracted and the feature may be identified using a pattern-perimeter extractor. The pattern-perimeter information may comprise global structural information, for example, reference fiducials for a photolithography process on the wafer, alignment marks, reference features on a wafer, features to be etched, etc. Identification of the feature may be performed by a feature extraction algorithm, for example.

In step 1130, the simulation method may include predicting an etch profile of the feature to be etched using a plasma etch process. Predicting the etch profile may include predicting a first characteristic of a particle of a plasma in a first scale based on a first plurality of parameters and predicting a second characteristic of the particle in a second scale based on a modification of the first characteristic caused by a second plurality of parameters.

The first characteristic may comprise ion tilt, ion energy, ion trajectory, ion flux, ion angular distribution, among other characteristics. The first scale may be a wafer-scale having dimensions up to 400 mm. The first plurality of parameters may comprise chamber geometry, process conditions, or a wafer location. A wafer-scale model (e.g., wafer-scale model 310 of FIG. 3) may be used to predict the first characteristic of the plasma in wafer-scale.

The second scale may include a die-scale having dimensions in the range of 5 mm-20 mm or more. A die (e.g., peripheral die 410 of FIG. 4A) may include a plurality of features having dimensions in the range of 5 nm-100 µm or more. A die-scale model (e.g., die-scale model 320 of FIG. 3) may be configured to receive one or more of the first characteristic of the plasma and predict one or more of the second characteristics in die-scale. The second characteristic may include a modification of ion tilt, ion energy, ion trajectory, ion flux, ion angular distribution, neutral flux, radical flux, among other characteristics. The modification of characteristics of an ion, neutral or radical in a plasma approaching a surface of a feature on a die may be caused by factors including, but not limited to, pattern-perimeter density, pattern-perimeter density variation, or pattern layout, among other factors. For example, differential surface charging effects due to pattern-perimeter density variation may modify the ion tilt, ion trajectory, ion angular distribution, ion energy, or ion flux of the incident ions. As a different example, micro-loading effects due to pattern-perimeter density variation may modify the flux of neutrals or radicals incident on the die surface. The die-scale model may be configured to predict the modification of plasma characteristics from wafer-scale based on a location r' of the feature with respect to the center of the die ($x_0$, $y_0$).

In some embodiments, predicting the modification of plasma characteristics as the ion approaches the die surface may include accessing a pattern layout of the die. The pattern layout may include a pattern-perimeter density map or a pattern-perimeter density variation map. The pattern-perimeter density map may comprise regions of high pattern-perimeter density (dense regions) and lower pattern-perimeter density (isolated regions) based on the die design for a desired application. The die-scale model may predict the modification of plasma characteristics based on the pattern-perimeter density map or the pattern-perimeter density variation map.

In the die-scale model, predicting the modification of plasma characteristics based on the pattern-perimeter density map or the pattern-perimeter density variation map may include identifying a first region of the die having a first pattern-perimeter density and a second region of the die having a second pattern-perimeter density different from the first pattern-perimeter density. The first and the second regions may include the dense and the isolated regions, respectively. It is appreciated that the first and the second regions may include the isolated and the dense regions, respectively, as well.

After accessing the pattern-perimeter density map, the die-scale model may predict a concentration gradient of etchants based on the identified dense and the isolated regions. The concentration gradient of etchants caused by the higher consumption of etchants in dense regions compared to isolated regions may result in diffusion of uncharged particles of the plasma including neutrals or radicals from isolated to dense regions on the die surface. The die-scale model may predict the modification of plasma characteristics at a location r' based on the neighboring patterns, pattern-perimeter density, pattern-perimeter density variation, or a pattern-perimeter density gradient.

In step 1140, the simulation method may include generating a second image comprising the predicted etch profile of the feature. The second image may comprise a trained image (e.g., trained image 950 of FIG. 9) of a simulated after-etch profile of the feature. The simulated image may be generated based on predicted plasma characteristics and modification of plasma characteristics in wafer-scale and die-scale, respectively. The simulated image may be a predicted etch profile of a developed feature in the training image.

Figure 12:
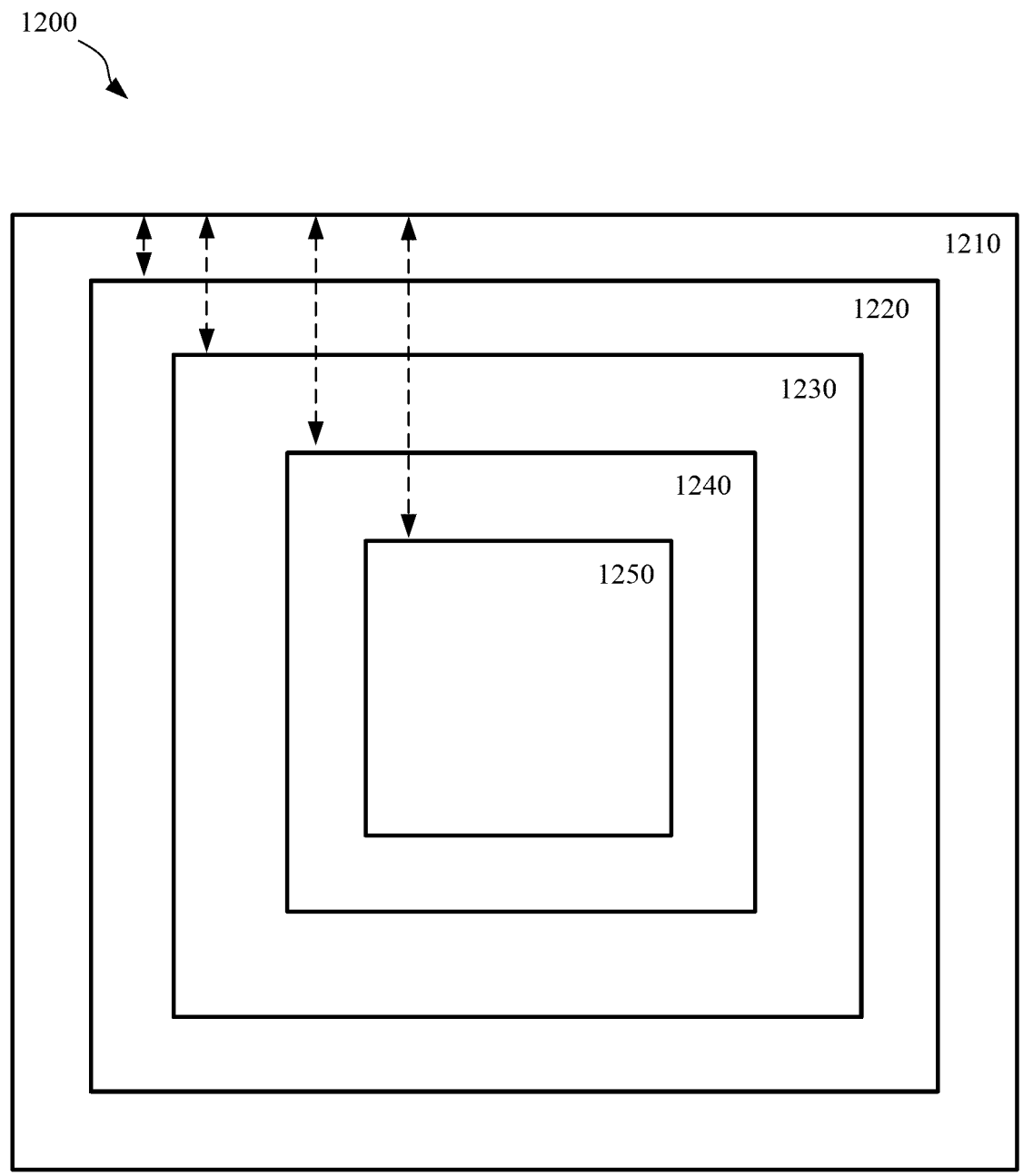
FIG. 12 illustrates an exemplary multi-scale physical plasma etch model, consistent with embodiments of the present disclosure.

Reference is now made to FIG. 12, which illustrates an exemplary multi-scale physical etch model 1200, consistent with embodiments of the present disclosure. Multi-scale etch model 1200 may comprise a fab-scale model 1210, a chamber-scale model 1220, a wafer-scale model 1230, a die-scale model 1240, and a feature-scale model 1250, to generate a simulated etch profile based on the multi-scale physical etch model approach.

A semiconductor wafer processing facility is generally referred to as a fabrication facility, or a "fab." A fab may be equipped with one or more plasma reactors configured to perform plasma processes including plasma deposition, plasma etching, plasma treatments, or the like. To increase the wafer throughput, reduce the cycle time, and improve process control, multiple plasma reactors may be configured and utilized to perform a single process, a single step, or a part of a process of the wafer processing cycle. For example, multiple plasma reactors may be engaged to perform a polysilicon gate etch on a large batch of wafers, and the etch characteristics of the features produced on all wafers from every reactor are expected to be substantially similar or within the specification. However, in practice, reactors do not process wafers identically and therefore, cause variations in the etch characteristics of features produced. In some instances, features of wafers processed in the same tool may vary between cycles or even within the same cycle. These variations in etch characteristics may be caused by factors including, but not limited to, chamber processing history, chamber characteristics, hardware settings, maintenance schedules, chamber age, etch chemistries, etc. The variability in etch performance and etch characteristics of features may negatively impact the process yields, throughput, costs, and in some cases may also cause device failure.

One of the several methodologies to produce consistent etch features across multiple wafers processed in multiple chambers includes "chamber matching." Chamber matching may include, among other things, optimizing the operating parameters on a reference "golden" chamber and duplicating the optimized parameters to multiple chambers in the facility, or optimizing the operating parameters of every chamber within the specification and tolerance levels. The accuracy of modeling etch characteristics of a feature within a die on a wafer processed in a plasma chamber may be enhanced using a multi-scale physical etch model such as multi-scale physical etch model 1200, for example.

In some embodiments, multi-scale physical etch model 1200 may comprise two or more models. Although FIG. 12 shows five models, there may be more or fewer models, and the models may include one or more sub-modules. Information obtained from one model may be shared between one or more models, as indicated by the dotted lines in FIG. 12. In some embodiments, fab-scale model 1210 may be configured to predict boundary conditions of chambers within the fab, based on factors including, but not limited to, chamber conditions, chamber processing history, chamber limitations, or chamber maintenance schedules. For example, a chamber X in the fab may not be qualified to perform an etch process utilizing silane. Fab-scale model 1210 may obtain information associated with chamber X and may exclude the chamber from the chamber matching boundary conditions. Fab-scale model 1210 may further be configured to perform chamber matching based on the information obtained from one or more models such as chamber-scale model 1220, wafer-scale model 1230, die-scale model 1240, or feature-scale model 1250.

In some embodiments, boundary conditions may be applied to two or more chambers configured to perform a plasma process. For example, a plurality of chambers within the boundary conditions may form a network through which the information associated with one or more chambers may be shared. The information may be shared within the same scale or across multiple scales including chamber scale, wafer scale, die scale, or feature scale.

Chamber-scale model 1220 may be configured to predict characteristics of a chamber. The characteristics of the chamber may include, but are not limited to, chamber wall conditions, gas inlet location, pump outlet location, chamber geometry, chamber material, or the like. The boundary conditions for the chamber-scale model 1220 may be determined based on, for example, the locations within the chamber from which the information about the desired characteristic(s) may be extracted. In some embodiments, chamber-scale model may comprise a 1-dimensional (1D) network model.

Wafer-scale model 1230, die-scale model 1240, and feature-scale model 1250 may be analogous to wafer-scale model 310, die-scale model 320, and feature-scale model 330 of FIG. 3, respectively, and may perform substantially similar functions. In some embodiments, the boundary conditions, physical models, and algorithms used may be different based on the scale or the level. In some embodiments, the boundary conditions, physical models, and algorithms at one or more levels may be influenced by the boundary conditions, physical models, and algorithms at other levels. For example, the boundary conditions for fab-scale model 1210, though different from boundary conditions of chamber-scale model 1220, may be interdependent.

Using multi-scale physical etch model 1200, the etch characteristics of a feature on a wafer (e.g., wafer 403 of FIG. 4A) may be predicted based on information obtained from one or more scales including die-scale, wafer-scale, chamber-scale, or fab-scale. As an example, the etch characteristics of a feature may vary based on the pattern-perimeter density map in the die-scale, and the etch characteristics may be predicted based on at least information obtained using die-scale model 320. In some embodiments, the etch characteristics of a feature may vary based on the pattern-perimeter density map and the ion trajectory or the ion tilt at a location on the wafer. The etch characteristics of the feature may be predicted based on the information obtained from die-scale model 320 and wafer-scale model 310.

In some embodiments, the etch characteristics of a feature, in addition to die-scale and wafer-scale factors, may vary based on the chamber wall conditions, for example. The information associated with a characteristic of the chamber may be obtained using chamber-scale model 1220. The etch recipe, etch process, etch duration, etch chemistry, or the like, of the etch process performed may influence the characteristic of the chamber such as chamber wall condition, chamber pressure, gas inlet locations, pump outlet locations. The end-of-line yield of a wafer may be influenced by one or more chamber characteristics. For example, the etch characteristics of a feature on a wafer processed in a chamber configured to run lean etch chemistry may be different from the chamber configured to run polymerization etch chemistry. Therefore, information obtained from chamber-scale model 1220 may influence the information in wafer-scale model 1230, or die-scale model 1240, or feature-scale model 1250.

In some embodiments, the etch characteristics of a feature, in addition to die-scale, wafer-scale, and chamber-scale, may vary based on the chamber in which the etch process is performed, for example. The information associated with the chamber of the plurality of chambers in the fab may be obtained using fab-scale model 1210. In some embodiments, information obtained from feature-scale model 1250 may be used to perform chamber matching in fab-scale model 1210 by adjusting the operating parameters, or fine tuning the etch conditions.

In some embodiments, multi-scale physical etch model 1200 may be configured to control etch tilt, as referred to in FIG. 4B. The etch tilt may be adjusted, for example, by adjusting a characteristic of a focus ring (e.g., focus ring 205 of FIG. 2). The characteristic of focus ring 205 may include a horizontal position, a vertical position, a shape, a construction material, a cross-section, or an applied voltage to the focus ring. For example, the voltage applied to the focus ring may be adjusted to adjust the trajectory of the charged particles of the plasma toward the wafer edge, or the vertical position of the focus ring may be physically adjusted to adjust the etchant confinement at the edge of the wafer, shape of the plasma sheath, or the trajectory of the ions of the plasma immediately above the wafer surface. The modified trajectory or the ion tilt approaching the wafer surface may influence the etch profile of the feature.

A non-transitory computer readable medium may be provided that stores instructions for a processor of a controller (e.g., controller 50 of FIG. 1) to carry out image inspection, image acquisition, image processing, database management, numerical analysis of data, executing modeling and simulation algorithms, data storage, generating images, etc. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

Embodiments of the present disclosure can be further described by the following clauses.

1. A method for simulating a plasma etch process, the method comprising:
  predicting a first characteristic of a particle of a plasma in a first scale based on a first plurality of parameters;
  predicting a second characteristic of the particle in a second scale based on a modification of the first characteristic caused by a second plurality of parameters; and
  simulating an etch characteristic of a feature based on the first and the second characteristics of the particle.

2. The method of clause 1, further comprising predicting a sheath profile of the plasma in the first scale based on the first plurality of parameters, wherein the first scale comprises a wafer-scale.

3. The method of clause 2, wherein predicting the first characteristic comprises determining a gradient of the predicted sheath profile, and wherein the first characteristic comprises an angle of incidence, a trajectory, or an energy of the particle directed towards a wafer.

4. The method of clause 3, wherein the first plurality of parameters comprises geometry of a plasma reactor configured to perform the plasma etch process, a process condition for the plasma etch process, or a location on the wafer.

5. The method of any one of clauses 3 and 4, wherein predicting the second characteristic comprises predicting a modification of the angle of incidence, the trajectory, or the energy of the particle in the second scale, and wherein the second scale comprises a die-scale.

6. The method of clause 5, wherein predicting the second characteristic further comprises:
  accessing a layout of a die, the layout comprising a pattern-perimeter density map; and
  predicting the second characteristic of the particle based on the pattern-perimeter density map, wherein the particle comprises a charged particle or an uncharged particle.

7. The method of clause 6, wherein predicting the second characteristic of the charged particle of the plasma comprises:
  identifying, based on the pattern-perimeter density map, a first region of the die having a first pattern-perimeter density and a second region of the die having a second pattern-perimeter density different from the first pattern-perimeter density;
  predicting an electric potential gradient between the identified first and the second regions; and
  predicting the second characteristic of the charged particle based on the electric potential gradient.

8. The method of clause 7, wherein predicting the electric potential gradient comprises:
  predicting a first electric potential of the first region comprising a dense region having a high pattern-perimeter density; and
  predicting a second electric potential of the second region comprising an isolated region having a lower pattern-perimeter density, wherein the first and the second electric potentials are different.

9. The method of clause 8, wherein the first electric potential is lower than the second electric potential.

10. The method of any one of clauses 7-9, wherein predicting the second characteristic of the uncharged particle of the plasma comprises:
  predicting a concentration gradient of an etchant between the identified first and the second regions;
  predicting a diffusion flux of the etchant based on the concentration gradient; and
  predicting the second characteristic of the uncharged particle based on the diffusion flux.

11. The method of clause 10, wherein predicting the concentration gradient comprises:
  predicting a first concentration of the etchant in the first region; and
  predicting a second concentration of the etchant in the second region, wherein the first and the second concentrations are different.

12. The method of clause 11, wherein the first concentration is lower than the second concentration.

13. The method of any one of clauses 6-12, further comprising predicting the second characteristic of the particle in the second scale based on a pattern-perimeter density gradient of the die and a Gaussian kernel, wherein the Gaussian kernel is a multi-length scale kernel comprising a length scale ranging from 5 nm to 50 µm.

14. The method of clause 13, wherein the second plurality of parameters comprises the layout, a pattern-perimeter density, a pattern-perimeter density variation, or the pattern-perimeter density gradient of the die.

15. The method of any one of clauses 6-14, wherein simulating the etch characteristic comprises simulating an etch rate, an etch profile, or an etch asymmetry of the feature based on the pattern-perimeter density map of the die.

16. A method for generating a simulated image of a feature, the method comprising:
acquiring a first image of the feature;
identifying the feature based on a pattern-perimeter information from the image;
predicting an etch profile of the feature to be etched using a plasma etch process, the predicting comprising:
predicting a first characteristic of a particle of a plasma in a first scale based on a first plurality of parameters; and
predicting a second characteristic of the particle in a second scale based on a modification of the first characteristic caused by a second plurality of parameters; and
generating a second image comprising the predicted etch profile of the feature.

17. The method of clause 16, further comprising acquiring the first image from a user-defined database, wherein the user-defined database comprises a graphic database system.

18. The method of any one of clauses 16 and 17, wherein identifying the feature comprises comparing the pattern-perimeter information and a trained feature from a trained image, using a machine learning network.

19. The method of any one of clauses 16-18, wherein the first image comprises an after-develop image of the feature.

20. The method of any one of clauses 16-19, wherein the first scale comprises a wafer-scale and the second scale comprises a die-scale.

21. The method of clause 20, wherein predicting the etch profile further comprises predicting a sheath profile of the plasma in the wafer-scale based on the first plurality of parameters.

22. The method of clause 21, wherein predicting the first characteristic comprises determining a gradient of the predicted sheath profile, and wherein the first characteristic comprises an angle of incidence, a trajectory, or an energy of the particle directed towards a wafer.

23. The method of clause 22, wherein the first plurality of parameters comprises geometry of a plasma reactor configured to perform the plasma etch process, a process condition for the plasma etch process, or a location on the wafer.

24. The method of any one of clauses 22 and 23, wherein predicting the second characteristic comprises predicting a modification of the angle of incidence, the trajectory, or the energy of the particle in the die-scale.

25. The method of clause 24, wherein predicting the second characteristic further comprises:
accessing a layout of a die, the layout comprising a pattern-perimeter density map; and
predicting the second characteristic of the particle based on the pattern-perimeter density map, wherein the particle comprises a charged particle or an uncharged particle.

26. The method of clause 25, wherein predicting the second characteristic of the charged particle of the plasma further comprises:
identifying, based on the pattern-perimeter density map, a first region of the die having a first pattern-perimeter density and a second region of the die having a second pattern-perimeter density different from the first pattern-perimeter density;
predicting an electric potential gradient based on the identified first and the second regions; and
predicting the second characteristic of the charged particle based on the electric potential gradient.

27. The method of clause 26, wherein predicting the electric potential gradient comprises:
predicting a first electric potential of the first region comprising a dense region having a high pattern-perimeter density; and
predicting a second electric potential of the second region comprising an isolated region having a lower pattern-perimeter density, wherein the first and the second electric potentials are different.

28. The method of clause 27, wherein the first electric potential is lower than the second electric potential.

29. The method of any one of clauses 26-28, wherein predicting the second characteristic of the uncharged particle of the plasma comprises:
predicting a concentration gradient of an etchant between the identified first and the second regions;
predicting a diffusion flux of the etchant based on the concentration gradient; and
predicting the second characteristic of the uncharged particle based on the diffusion flux.

30. The method of clause 29, wherein predicting the concentration gradient comprises:
predicting a first concentration of the etchant in the first region; and
predicting a second concentration of the etchant in the second region, wherein the first and the second concentrations are different.

31. The method of clause 30, wherein the first concentration is lower than the second concentration.

32. The method of any one of clauses 24-31, further comprising predicting the second characteristic of the particle in the second scale based on a pattern-perimeter density gradient of the die and a Gaussian kernel, wherein the Gaussian kernel is a multi-length scale kernel comprising a length scale ranging from 5 nm to 50 μm.

33. The method of clause 32, wherein the second plurality of parameters comprises the layout, a pattern-perimeter density, a pattern-perimeter density variation, or the pattern-perimeter density gradient of the die.

34. A plasma etch simulation system, comprising:
a memory storing a set of instructions; and
a processor configured to execute the set of instructions to cause the plasma etch simulation system to:
predict a first characteristic of a particle of a plasma in a first scale based on a first plurality of parameters;
predict a second characteristic of the particle in a second scale based on a modification of the first characteristic caused by a second plurality of parameters; and
simulate an etch characteristic of a feature based on the first and the second characteristics of the particle.

35. The system of clause 34, wherein the processor is configured to execute the set of instructions to further cause the plasma etch simulation system to:
predict a sheath profile of the plasma in the first scale based on the first plurality of parameters;
determine a gradient of the predicted sheath profile; and
determine an angle of incidence, a trajectory, or an energy of the particle directed towards a wafer based on the gradient of the predicted sheath profile.

36. The system of clause 35, wherein the processor is configured to execute the set of instructions to further cause the plasma etch simulation system to:
access a layout of a die, the layout comprising a pattern-perimeter density map; and
predict the second characteristic of the particle based on the pattern-perimeter density map, wherein the particle comprises a charged particle or an uncharged particle, and wherein the second characteristic comprises a modification of the angle of incidence, the trajectory, or the energy of the particle.

37. The system of clause 36, wherein the processor is configured to execute the set of instructions to further cause the plasma etch simulation system to:
identify, based on the pattern-perimeter density map, a first region of the die having a first pattern-perimeter density and a second region of the die having a second pattern-perimeter density different from the first pattern-perimeter density;
predict an electric potential gradient based on the identified first and the second regions; and
predict the second characteristic of the charged particle based on the electric potential gradient.

38. The system of clause 37, wherein the processor is configured to execute the set of instructions to further cause the plasma etch simulation system to:
predict a first electric potential of the first region comprising a dense region having a high pattern-perimeter density; and
predict a second electric potential of the second region comprising an isolated region having a lower pattern-perimeter density, wherein the first and the second electric potentials are different.

39. The system of any one of clauses 36-38, wherein the processor is configured to execute the set of instructions to further cause the plasma etch simulation system to:
predict a concentration gradient of an etchant between the identified first and the second regions;
predict a diffusion flux of the etchant based on the concentration gradient; and
predict the second characteristic of the uncharged particle based on the diffusion flux.

40. The system of clause 39, wherein the processor is configured to execute the set of instructions to further cause the plasma etch simulation system to:
predict a first concentration of the etchant in the first region; and
predict a second concentration of the etchant in the second region, wherein the first and the second concentrations are different.

41. The system of any one of clauses 34-40, wherein the processor is configured to execute the set of instructions to further cause the plasma etch simulation system to predict the second characteristic of the particle in the second scale based on a pattern-perimeter density gradient of the die and a Gaussian kernel, wherein the Gaussian kernel is a multi-length scale kernel comprising a length scale ranging from 5 nm to 50 μm.

42. A non-transitory computer readable medium storing a set of instructions that is executable by one or more processors of an apparatus to cause the apparatus to perform a method of simulating a plasma etch process, the method comprising:
predicting a first characteristic of a particle of a plasma in a first scale based on a first plurality of parameters;
predicting a second characteristic of the particle in a second scale based on a modification of the first characteristic caused by a second plurality of parameters; and
simulating an etch characteristic of a feature based on the first and the second characteristics of the particle.

43. The non-transitory computer readable medium of clause 42, wherein the set of instructions that is executable by the one or more processors of the apparatus to cause the apparatus to further perform:
predicting a sheath profile of the plasma in the first scale based on the first plurality of parameters;
determining a gradient of the predicted sheath profile; and
determining an angle of incidence, a trajectory, or an energy of the particle directed towards a wafer based on the gradient of the predicted sheath profile.

44. The non-transitory computer readable medium of clause 43, wherein the set of instructions that is executable by the one or more processors of the apparatus to cause the apparatus to further perform:
accessing a layout of a die, the layout comprising a pattern-perimeter density map; and
predicting the second characteristic of the particle of the plasma based on the pattern-perimeter density map, wherein the particle comprises a charged particle or an uncharged particle, and wherein the second characteristic comprises a modification of the angle of incidence, the trajectory, or the energy of the particle.

45. The non-transitory computer readable medium of clause 44, wherein the set of instructions that is executable by the one or more processors of the apparatus to cause the apparatus to further perform:
identifying, based on the pattern-perimeter density map, a first region of the die having a first pattern-perimeter density and a second region of the die having a second pattern-perimeter density different from the first pattern-perimeter density;
predicting an electric potential gradient based on the identified first and the second regions; and
predicting the second characteristic of the charged particle based on the electric potential gradient.

46. The non-transitory computer readable medium of clause 45, wherein the set of instructions that is executable by the one or more processors of the apparatus to cause the apparatus to further perform:
predicting a concentration gradient of an etchant between the identified first and the second regions;
predicting a diffusion flux of the etchant based on the concentration gradient; and
predicting the second characteristic of the uncharged particle based on the diffusion flux.

47. The non-transitory computer readable medium of any one of clauses 42-46, wherein the set of instructions that is executable by the one or more processors of the apparatus to cause the apparatus to further perform predicting the second characteristic of the particle in the second scale based on a pattern-perimeter density gradient of the die and a Gaussian kernel, wherein the Gaussian kernel is a multi-length scale kernel comprising a length scale ranging from 5 nm to 50 μm.

48. A non-transitory computer readable medium storing a set of instructions that is executable by one or more processors of an apparatus to cause the apparatus to perform a method of simulating a plasma etch process, the method comprising:
acquiring a first image of the feature;
identifying the feature based on pattern information;

predicting an etch profile of the feature to be etched using a plasma etch process, the predicting comprising:
  predicting a first characteristic of a particle of a plasma in a first scale based on a first plurality of parameters; and
  predicting a second characteristic of the particle in a second scale based on a modification of the first characteristic caused by a second plurality of parameters; and
generating a second image comprising the predicted etch profile of the feature.

49. The non-transitory computer readable medium of clause 48, wherein the set of instructions that is executable by the one or more processors of the apparatus to cause the apparatus to further perform acquiring the first image from a user-defined database, wherein the user-defined database comprises a graphic database system.

50. The non-transitory computer readable medium of any one of clauses 48 and 49, wherein the pattern information comprises pattern-perimeter information, wherein the set of instructions that is executable by the one or more processors of the apparatus to cause the apparatus to further perform comparing the pattern-perimeter information and a trained feature from a trained image, using a machine learning network.

51. The non-transitory computer readable medium of any one of clauses 48-50, wherein the set of instructions that is executable by the one or more processors of the apparatus to cause the apparatus to further perform:
  predicting a sheath profile of the plasma in the first scale based on the first plurality of parameters;
  determining a gradient of the predicted sheath profile; and
  determining an angle of incidence, a trajectory, or an energy of the particle directed towards a wafer based on the gradient of the predicted sheath profile.

52. The non-transitory computer readable medium of clause 51, wherein the set of instructions that is executable by the one or more processors of the apparatus to cause the apparatus to further perform:
  accessing a layout of a die, the layout comprising a pattern-perimeter density map; and
  predicting the second characteristic of the particle of the plasma based on the pattern-perimeter density map, wherein the particle comprises a charged particle or an uncharged particle, and wherein the second characteristic comprises a modification of the angle of incidence, the trajectory, or the energy of the particle.

53. The non-transitory computer readable medium of clause 52, wherein the set of instructions that is executable by the one or more processors of the apparatus to cause the apparatus to further perform:
  identifying, based on the pattern-perimeter density map, a first region of the die having a first pattern-perimeter density and a second region of the die having a second pattern-perimeter density different from the first pattern-perimeter density;
  predicting an electric potential gradient based on the identified first and the second regions; and
  predicting a modified trajectory of the charged particle based on the electric potential gradient.

54. The non-transitory computer readable medium of any one of clauses 48-53, wherein the set of instructions that is executable by the one or more processors of the apparatus to cause the apparatus to further perform predicting the second characteristic of the particle in the second scale based on a pattern-perimeter density gradient of the die and a Gaussian kernel, wherein the Gaussian kernel is a multi-length scale kernel comprising a length scale ranging from 5 nm to 50 µm.

55. A method for simulating a plasma etch process, the method comprising:
  predicting, in a first scale, a first characteristic of a chamber of a plurality of chambers configured to perform the plasma etch process;
  predicting, in a second scale, a second characteristic of the chamber of the plurality of chambers, wherein the first scale comprises the second scale; and
  simulating an etch characteristic of a feature based on the first and the second characteristics of the chamber.

56. The method of clause 55, further comprising:
  predicting a first characteristic of a particle of a plasma in a third scale based on a first plurality of parameters;
  predicting a second characteristic of the particle in a fourth scale based on a modification of the first characteristic of the particle caused by a second plurality of parameters; and
  simulating the etch characteristic of the feature based on the first and the second characteristics of the particle.

57. The method of any one of clauses 55 and 56, wherein the first characteristic of the chamber comprises a chamber status, a chamber type, or a chamber processing history, and wherein the second characteristic of the chamber comprises a chamber wall condition, a chamber pressure, or a characteristic of a focus ring of the chamber.

58. The method of clause 57, further comprising simulating the etch characteristic of the feature based on the characteristic of the focus ring, wherein adjusting the characteristic of the focus ring adjusts the simulated etch characteristic of the feature.

59. The method of clause 58, wherein adjusting the characteristic of the focus ring comprises adjusting a position or an applied voltage to the focus ring.

60. The method of any one of clauses 55-59, wherein the first scale comprises a fab-scale and the second scale comprises a chamber-scale.

61. A plasma etch simulation system, comprising:
  a memory storing a set of instructions; and
  a processor configured to execute the set of instructions to cause the plasma etch simulation system to:
    predict, in a first scale, a first characteristic of a chamber of a plurality of chambers configured to perform the plasma etch process;
    predict, in a second scale, a second characteristic of the chamber of the plurality of chambers, wherein the first scale comprises the second scale; and
    simulate an etch characteristic of a feature based on the first and the second characteristics of the chamber.

62. The system of clause 61, wherein the processor is configured to execute the set of instructions to further cause the plasma etch simulation system to:
  predict a first characteristic of a particle of a plasma in a third scale based on a first plurality of parameters;
  predict a second characteristic of the particle in a fourth scale based on a modification of the first characteristic of the particle caused by a second plurality of parameters; and
  simulate the etch characteristic of the feature based on the first and the second characteristics of the particle.

63. The system of any one of clauses 61 and 62, wherein the first characteristic of the chamber comprises a chamber status, a chamber type, or a chamber processing history, and wherein the second characteristic of the chamber comprises a chamber wall condition, a chamber pressure, or a characteristic of a focus ring of the chamber.

64. The system of clause 63, wherein an adjustment of the characteristic of the focus ring adjusts the simulated etch characteristic of the feature.

65. The system of clause 64, wherein the adjustment of the characteristic of the focus ring comprises an adjustment of the position or the applied voltage to the focus ring.

66. The system of any one of clauses 63 and 64, wherein the characteristic of the focus ring comprises a material, a position, an applied voltage, or an operating condition of the focus ring.

The block diagrams in the figures illustrate the architecture, functionality, and operation of possible implementations of systems, methods, and computer hardware or software products according to various exemplary embodiments of the present disclosure. In this regard, each block in a flowchart or block diagram may represent a module, segment, or portion of code, which comprises one or more executable instructions for implementing the specified logical functions. It should be understood that in some alternative implementations, functions indicated in a block may occur out of the order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The descriptions above are intended to be illustrative, not limiting. Thus, it will be apparent to one skilled in the art that modifications may be made as described without departing from the scope of the claims set out below.

What is claimed is:

1. A non-transitory computer readable medium having instructions therein or thereon, the instructions, when executed by one or more processors, configured to cause the one or more processors to at least:
    acquire a first image of a feature;
    identify the feature based on pattern information from the first image;
    predict an etch profile of the feature to be etched using a plasma etch process, the prediction comprising:
        prediction of a first characteristic of a particle of a plasma in a first scale based on a first plurality of parameters; and
        prediction of a second characteristic of the particle in a second scale based on a modification of the first characteristic caused by a second plurality of parameters; and
    generation of a second image comprising the predicted etch profile of the feature.

2. The medium of claim 1, wherein the instructions are further configured to cause the one or more processors to acquire the first image from a user-defined database, wherein the user-defined database comprises a graphic database system.

3. The medium of claim 1, wherein the pattern information comprises pattern-perimeter information, and wherein the instructions configured to cause the one or more processors to identify the feature are further configured to cause the one or more processors to compare the pattern-perimeter information and a trained feature from a trained image, using a machine learning network.

4. The medium of claim 1, wherein the first image comprises an after-develop image of the feature.

5. The medium of claim 1, wherein the first scale comprises a wafer-scale and the second scale comprises a die-scale.

6. The medium of claim 5, wherein the instructions configured to cause the one or more processors to predict the etch profile are further configured to cause the one or more processors to predict a sheath profile of the plasma in the wafer-scale based on the first plurality of parameters.

7. The medium of claim 6, wherein the instructions configured to cause the one or more processors to predict the first characteristic are further configured to cause the one or more processors to determine a gradient of the predicted sheath profile, and wherein the first characteristic comprises an angle of incidence, a trajectory, or an energy of the particle directed towards a wafer.

8. The medium of claim 7, wherein the first plurality of parameters comprises geometry of a plasma reactor configured to perform the plasma etch process, a process condition for the plasma etch process, or a location on the wafer.

9. The medium of claim 7, wherein the instructions configured to cause the one or more processors to predict the second characteristic are further configured to cause the one or more processors to predict a modification of the angle of incidence, the trajectory, or the energy of the particle in the die-scale.

10. The medium of claim 9, wherein the instructions configured to cause the one or more processors to predict the second characteristic are further configured to cause the one or more processors to:
    access a layout of a die, the layout comprising a pattern-perimeter density map; and
    predict the second characteristic of the particle based on the pattern-perimeter density map.

11. The medium of claim 10, wherein the particle comprises a charged particle and the instructions configured to cause the one or more processors to predict the second characteristic of the charged particle of the plasma are further configured to cause the one or more processors to:
    identify, based on the pattern-perimeter density map, a first region of the die having a first pattern-perimeter density and a second region of the die having a second pattern-perimeter density different from the first pattern-perimeter density;
    predict an electric potential gradient based on the identified first and second regions; and
    predict the second characteristic of the charged particle based on the electric potential gradient.

12. The medium of claim 11, wherein the instructions configured to cause the one or more processors to predict the electric potential gradient are further configured to cause the one or more processors to:

predict a first electric potential of the first region comprising a dense region having a high pattern-perimeter density; and predict a second electric potential of the second region comprising an isolated region having a lower pattern-perimeter density, wherein the first and the second electric potentials are different.

13. The medium of claim 10, wherein the particle comprises an uncharged particle and the instructions configured to cause the one or more processors to predict the second characteristic of the uncharged particle of the plasma are further configured to cause the one or more processors to:

identify, based on the pattern-perimeter density map, a first region of the die having a first pattern-perimeter density and a second region of the die having a second pattern-perimeter density different from the first pattern-perimeter density;

predict a concentration gradient of an etchant between the identified first and the second regions;

predict a diffusion flux of the etchant based on the concentration gradient; and predict the second characteristic of the uncharged particle based on the diffusion flux.

14. The medium of claim 13, wherein the instructions configured to cause the one or more processors to predict the concentration gradient are further configured to cause the one or more processors to:

predict a first concentration of the etchant in the first region; and predict a second concentration of the etchant in the second region, wherein the first and second concentrations are different.

15. The medium of claim 9, wherein the instructions are further configured to cause the one or more processors to predict the second characteristic of the particle in the second scale based on a pattern-perimeter density gradient of the die and a Gaussian kernel, wherein the Gaussian kernel is a multi-length scale kernel comprising a length scale ranging from 5 nm to 50 µm, and wherein the second plurality of parameters comprises the layout, a pattern-perimeter density, a pattern-perimeter density variation, or the pattern-perimeter density gradient of the die.

16. A method comprising:

acquiring a first image of the feature;

identifying the feature based on a pattern-perimeter information from the image;

predicting, by a hardware computer system, an etch profile of the feature to be etched using a plasma etch process, the predicting comprising:

predicting a first characteristic of a particle of a plasma in a first scale based on a first plurality of parameters; and predicting a second characteristic of the particle in a second scale based on a modification of the first characteristic caused by a second plurality of parameters; and generating a second image comprising the predicted etch profile of the feature.

17. The method of claim 16, further comprising acquiring the first image from a user-defined database, wherein the user-defined database comprises a graphic database system.

18. The method of claim 16, wherein the identifying the feature comprises comparing the pattern-perimeter information and a trained feature from a trained image, using a machine learning network.

19. The method of claim 16, wherein the first image comprises an after-develop image of the feature.

20. The method of claim 16, wherein the first scale comprises a wafer-scale and the second scale comprises a die-scale.

* * * * *